United States Patent
Suzuki et al.

(10) Patent No.: US 9,335,998 B2
(45) Date of Patent: May 10, 2016

(54) MULTI-CORE PROCESSOR SYSTEM, MONITORING CONTROL METHOD, AND COMPUTER PRODUCT

(71) Applicant: FUJITSU LIMITED, Kawasaki-shi, Kanagawa (JP)

(72) Inventors: Takahisa Suzuki, Kawasaki (JP); Koichiro Yamashita, Hachioji (JP); Hiromasa Yamauchi, Kawasaki (JP); Koji Kurihara, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 505 days.

(21) Appl. No.: 13/856,934

(22) Filed: Apr. 4, 2013

(65) Prior Publication Data
US 2013/0238882 A1    Sep. 12, 2013

Related U.S. Application Data

(63) Continuation of application No. PCT/JP2010/067469, filed on Oct. 5, 2010.

(51) Int. Cl.
*G06F 9/30* (2006.01)
*G06F 11/07* (2006.01)
*G06F 9/38* (2006.01)
*G06F 11/14* (2006.01)

(52) U.S. Cl.
CPC .......... *G06F 9/30043* (2013.01); *G06F 9/3009* (2013.01); *G06F 9/3842* (2013.01); *G06F 11/0724* (2013.01); *G06F 11/1407* (2013.01); *G06F 11/1438* (2013.01); *G06F 2201/865* (2013.01); *G06F 2209/5018* (2013.01)

(58) Field of Classification Search
None
See application file for complete search history.

(56) References Cited

U.S. PATENT DOCUMENTS

| | | | |
|---|---|---|---|
| 6,026,499 A | 2/2000 | Shirakihara et al. | |
| 7,373,548 B2* | 5/2008 | Reinhardt | G06F 11/1482 714/13 |
| 8,612,730 B2* | 12/2013 | Hall | G06F 9/3009 712/227 |
| 9,038,070 B2* | 5/2015 | Lippett | G06F 11/3636 717/124 |
| 2006/0117218 A1 | 6/2006 | Kitajima | |
| 2009/0031310 A1* | 1/2009 | Lev | G06F 11/1405 718/101 |
| 2010/0274972 A1* | 10/2010 | Babayan | G06F 9/3842 711/125 |

(Continued)

FOREIGN PATENT DOCUMENTS

| | | |
|---|---|---|
| JP | 10-214199 A | 8/1998 |
| JP | 2006-139621 A | 6/2006 |

(Continued)

OTHER PUBLICATIONS

'On the Potential of Latency Tolerant Execution in Speculative Multithreading' by Haitham Akkary et al., copyright ACM 2008.*

(Continued)

*Primary Examiner* — Steven Snyder
(74) *Attorney, Agent, or Firm* — Arent Fox LLP

(57) ABSTRACT

A multi-core processor system includes a given core among multiple cores, wherein the given core is configured to detect execution of a process by the cores; and generate upon detecting the execution of the process, a specific thread that saves state information indicating an executed state of the process and an executed state of each thread to be monitored of the process.

7 Claims, 14 Drawing Sheets

(56) References Cited

U.S. PATENT DOCUMENTS

| | | | |
|---|---|---|---|
| 2011/0067029 A1* | 3/2011 | Wolfe | G06F 9/505 718/102 |
| 2011/0126174 A1* | 5/2011 | Krauss | G06F 11/3466 717/127 |
| 2011/0126202 A1* | 5/2011 | Krauss | G06F 9/485 718/102 |
| 2011/0161961 A1* | 6/2011 | Fu | G06F 9/5027 718/102 |
| 2011/0302395 A1* | 12/2011 | Hall | G06F 9/3009 712/226 |
| 2012/0066555 A1* | 3/2012 | Ganesh | G06F 9/45533 714/49 |
| 2012/0089979 A1* | 4/2012 | Adar | G06F 9/45558 718/1 |
| 2013/0111194 A1* | 5/2013 | Grochowski | G06F 9/30003 712/228 |
| 2014/0019803 A1* | 1/2014 | Busaba | G06F 11/1438 714/16 |
| 2014/0019989 A1* | 1/2014 | Suzuki | G06F 9/5088 718/105 |
| 2014/0089734 A1* | 3/2014 | Busaba | G06F 11/0715 714/16 |
| 2014/0208330 A1* | 7/2014 | Pusukuri | G06F 9/4881 718/104 |
| 2015/0095627 A1* | 4/2015 | Dechene | G06F 9/30145 712/228 |
| 2015/0106789 A1* | 4/2015 | Cardona | G06F 11/302 717/127 |
| 2015/0198993 A1* | 7/2015 | Kim | G06F 1/3206 713/340 |
| 2015/0212823 A1* | 7/2015 | Li | G06F 9/3863 712/228 |
| 2015/0347255 A1* | 12/2015 | Lippett | G06F 11/3636 714/45 |

FOREIGN PATENT DOCUMENTS

| | | | |
|---|---|---|---|
| JP | 2007-133863 A | 5/2007 | |
| JP | 2008-003691 A | 1/2008 | |
| JP | 2008-310632 A | 12/2008 | |
| JP | 2001-331330 A | 11/2011 | |

OTHER PUBLICATIONS

'DMTCP: Transparent Checkpointing for Cluster Computations and the Desktop' by Jason Ansel et al., Feb. 24, 2009.*

'Paceline: Improving Single-Thread Performance in Nanoscale CMPs through Core Overclocking' by Greskamp and Torrellas, copyright 2007, IEEE.*

'Utilizing Dynamically Coupled Cores to Form a Resilient Chip Multiprocessor' by Christopher LaFrieda et al., Intl. Symp. on Dependable Systems and Networks (DSN), Jun. 2007.*

'Low-Latency, Concurrent Checkpointing for Parallel Programs' by Kai Li et al., IEEE Transactions on Parallel and Distributed Systems, vol. 5, No. 8, Aug. 1994.*

'Boosting Single-thread Performance in Multi-core Systems through Fine-Grain Multi-Threading' by Carlos Madriles et al., ISCA'09, Jun. 20-24, 2009.*

'Thread-Based Live Checkpointing of Virtual Machines' by Vasinee Siripoonya et al., 2011 IEEE International Symposium on Network Computing and Applications.*

'Towards Scalable Reliability Frameworks for Error Prone CMPs' by Joseph Sloan et al., CASES'09, Oct. 11-16, 2009.*

'Write-Ahead Logging' from SQLite, archived on Jul. 25, 2010.*

Eric Roman, "A Survey of Checkpoint/Restart Implementations", Lawrence Berkeley National laboratory, Berkeley, CA, pp. 1-9.

European Search Report issued Feb. 27, 2015; Application No. 10858110.9.

Chinese Office Action for Chinese Application No. 201080069414.X (partial translation of relevant portion).

* cited by examiner

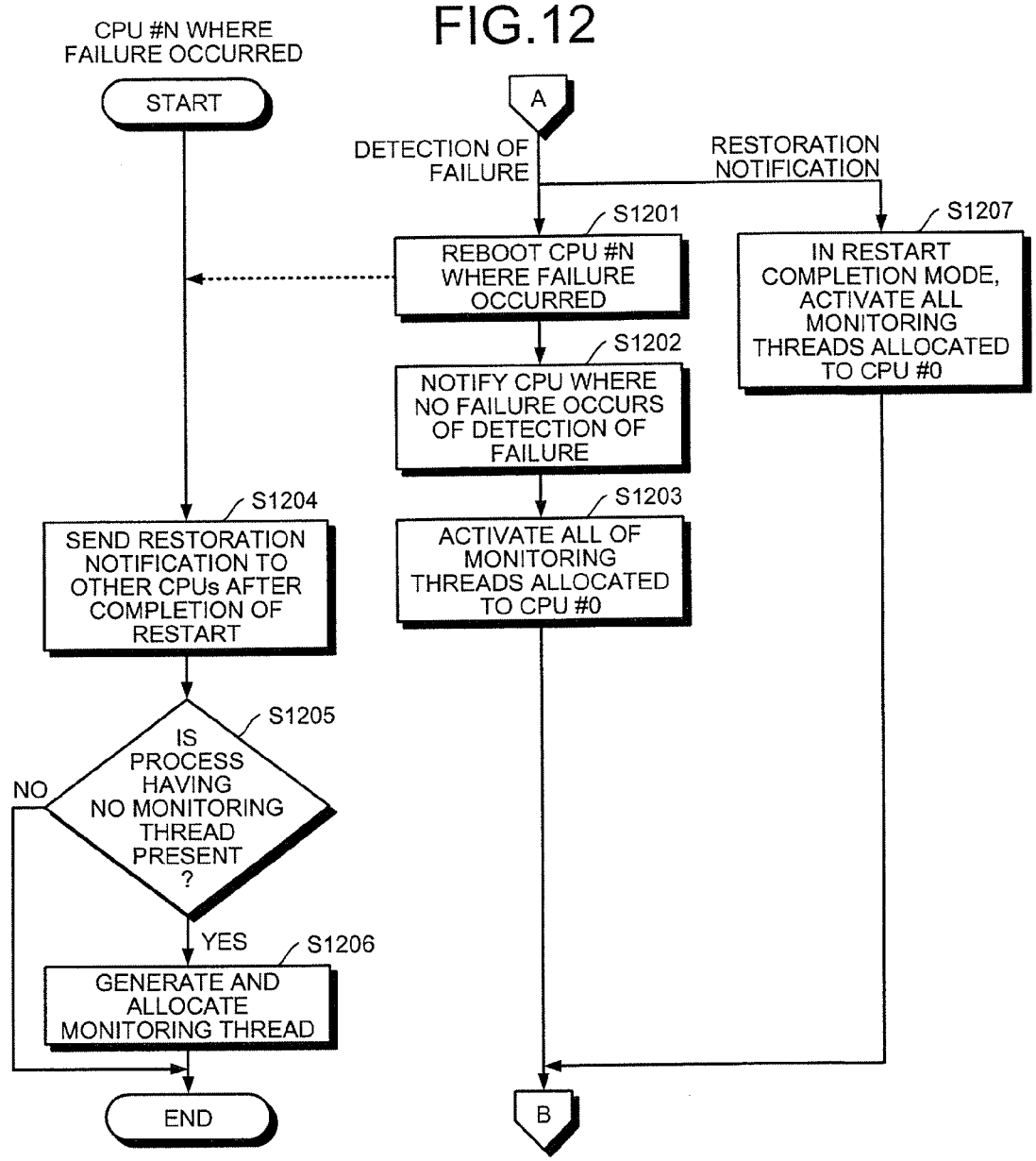

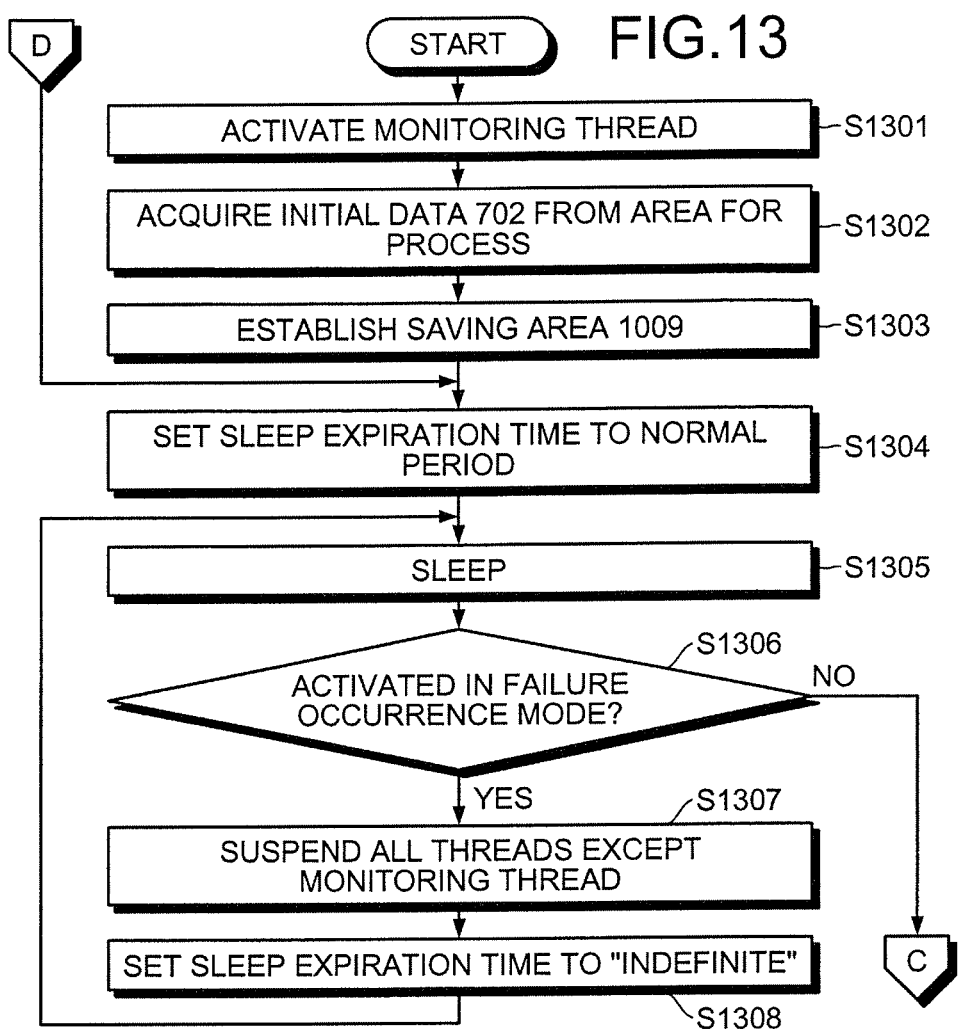

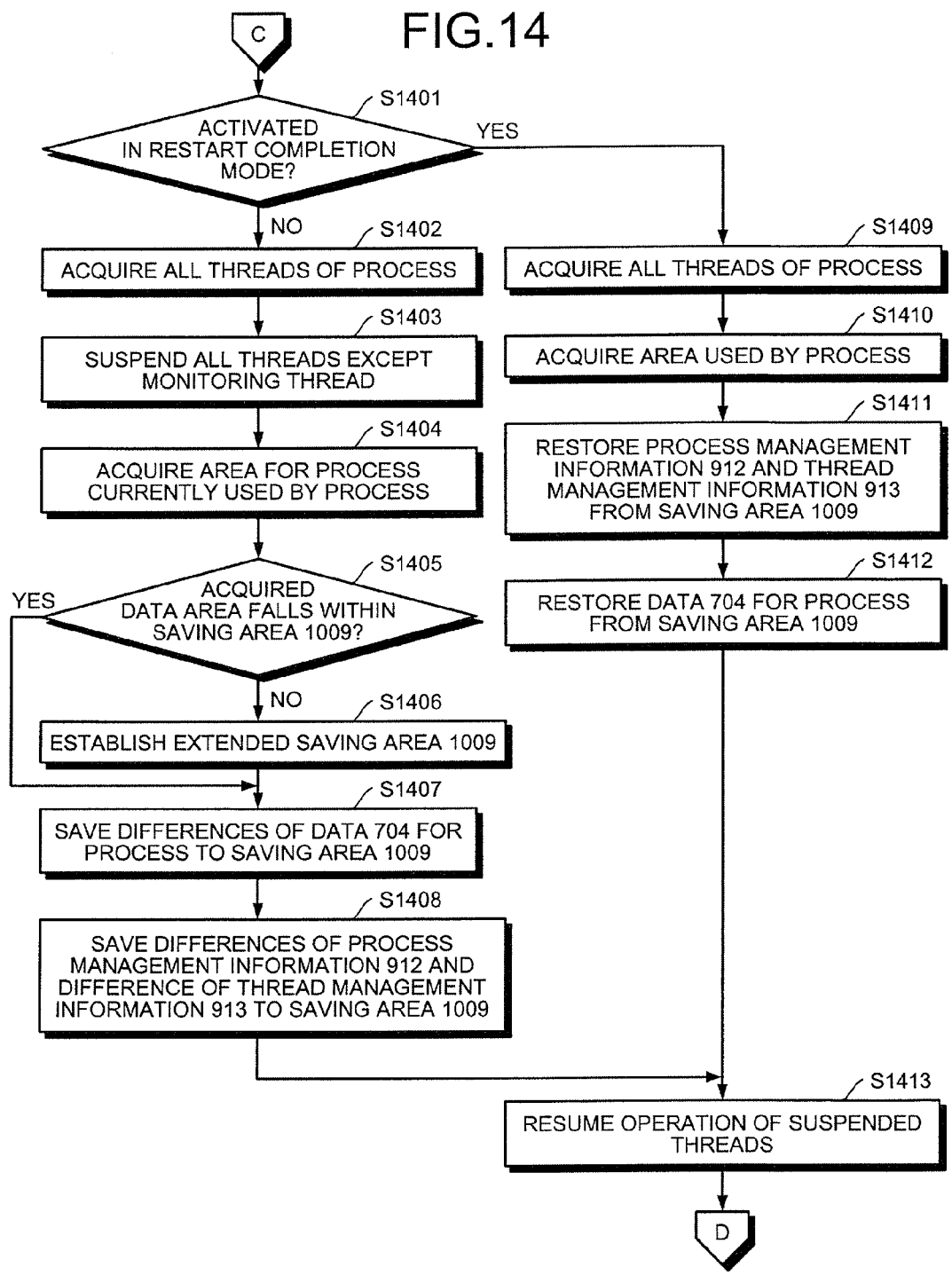

MULTI-CORE PROCESSOR SYSTEM, MONITORING CONTROL METHOD, AND COMPUTER PRODUCT

CROSS REFERENCE TO RELATED APPLICATIONS

This application is a continuation application of International Application PCT/JP2010/067469, filed on Oct. 5, 2010 and designating the U.S., the entire contents of which are incorporated herein by reference.

FIELD

The embodiment discussed herein is related a multi-core processor system, a monitoring control method, and a monitoring control program that control the monitoring of an apparatus.

BACKGROUND

A technique called checkpoint/restart has been disclosed as a technique for improving the reliability of computer systems (see, for example, "A Survey of Checkpoint/Restart Implementations", retrieved online Aug. 24, 2010, <URL:https://ftg.lbl.gov/CheckpointRestart/Pubs/checkpointSurvey-020724b.pdf>). This technique is a method of periodically backing up state information of individual applications or of the entire system so that if failure occurs, the system is restored to the state at the point in time of the backup, from which execution is resumed. As used herein, state information includes the contents of memory and processor register information.

The technique disclosed in "A Survey of Checkpoint/Restart Implementations" is a technique devised to eliminate the need to re-execute a process from the start if failure occurs during a high-level simulation process taking several days for calculation in the field of large-scale computers. Accordingly, a single application program works at one time and checkpoint/restart is used to achieve high reliability for each application. In recent years, an embedded system also performs a process requiring high reliability such as automobile control and, to prevent long-term uncontrollability upon the occurrence of failure, such a system is configured to return to the process promptly after the occurrence of failure, by using the technique of "A Survey of Checkpoint/Restart Implementations".

In a case of applying the technique of "A Survey of Checkpoint/Restart Implementations" to an embedded system, since multiple applications work cooperatively in the embedded system, a checkpoint/restart has to be set to be performed for all the applications, resulting in decreased development efficiency. Since an embedded system has fewer CPUs and less memory as compared with a large-scale computer, in the case of applying the technique of "A Survey of Checkpoint/Restart Implementations" to an embedded system, the checkpoint/restart is executed for the entire embedded system by the OS, etc.

As a technique to cope with the occurrence of failure in a multi-core processor system having multiple CPUs, a technique has been disclosed, for example, in which thread execution information is saved to memory so that if failure occurs at a CPU, the CPU is substituted with another CPU to execute the process (see, for example, Japanese Laid-Open Patent Publication No. 2006-139621). Another technique has been disclosed in which the states of processes under execution are collectively monitored by a monitoring device (see, for example, Japanese Laid-Open Patent Publication No. 2008-310632).

Applying the techniques disclosed in "A Survey of Checkpoint/Restart Implementations" and Japanese Laid-Open Patent Publication No. 2008-310632 to a restoration process executed upon the occurrence of failure in a multi-core processor system yields a technique in which a specific CPU performs a process of saving the state information of the entire multi-core processor system (hereinafter, "Prior Art 1"). An application of Prior Art 1 enables a multi-core processor system to restore the state using the saved state information when failure occurs.

SUMMARY

According to an aspect of an embodiment, a multi-core processor system includes a given core among multiple cores, wherein the given core is configured to detect execution of a process by the cores; and generate upon detecting the execution of the process, a specific thread that saves state information indicating an executed state of the process and an executed state of each thread to be monitored of the process.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 12 is a flowchart (2) of the event process performed by the OS;

FIG. 13 is a flowchart (1) of the operations of the monitoring thread; and

FIG. 14 is a flowchart (2) of the operations of the monitoring thread.

DESCRIPTION OF EMBODIMENTS

An embodiment of a multi-core processor system, a monitoring control method, and a monitoring control program according to the present invention will be described in detail with reference to the accompanying drawings.

Figure 1:
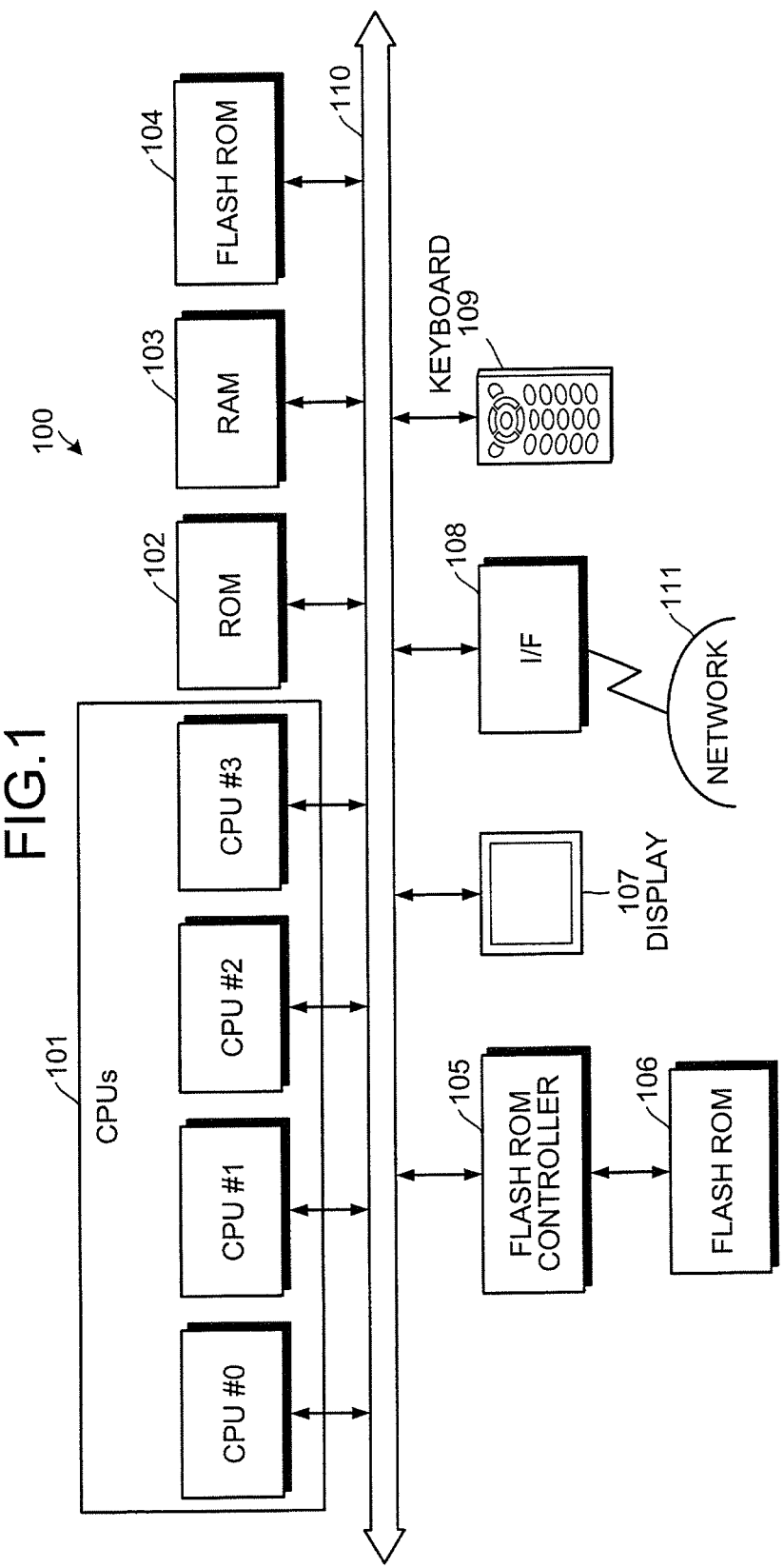
FIG. 1 is a block diagram of a hardware configuration of a multi-core processor system 100 according to an embodiment.

FIG. 1 is a block diagram of a hardware configuration of a multi-core processor system 100 according to an embodiment. As depicted in FIG. 1, a multi-core processor system 100 includes multiple CPUs 101, read-only memory (ROM) 102, random access memory (RAM) 103, flash ROM 104, a flash ROM controller 105, and flash ROM 106. The multi-core processor system includes a display 107, an interface (I/F) 108, and a keyboard 109, as input/output devices for the user and other devices. The components of the multi-core system 100 are respectively connected by a bus 110.

The CPUs 101 govern overall control of the multi-core processor system 100. The CPUs 101 refer to CPUs that are single core processors connected in parallel. Although the CPUs 101 include CPUs #0 to #3 herein, configuration may be such that the CPUs 101 include 2 or more CPUs. The CPUs #0 to #3 have a dedicated cache memory, respectively. Further, the multi-core processor system is a system of computers that include processors equipped with multiple cores. The multiple cores may be provided as a single processor equipped with multiple cores or a group of single-core processors connected in parallel. In the present embodiment, description will be given taking CPUs that are single-core processors and connected in parallel as an example.

The ROM 102 stores therein programs such as a boot program. The RAM 103 is used as a work area of the CPUs 101. The flash ROM 104 stores system software such as an operating system (OS), and application software. For example, when the OS is updated, the multi-core processor system 100 receives a new OS via the I/F 108 and updates the old OS that is stored in the flash ROM 104 with the received new OS.

The flash ROM controller 105, under the control of the CPUs 101, controls the reading and writing of data with respect to the flash ROM 106. The flash ROM 106 stores therein data written under control of the flash ROM controller 105. Examples of the data include image data and video data acquired by the user of the multi-core processor system through the I/F 108. A memory card, SD card and the like may be adopted as the flash ROM 106.

The display 107 displays, for example, data such as text, images, functional information, etc., in addition to a cursor, icons, and/or tool boxes. A thin-film-transistor (TFT) liquid crystal display and the like may be employed as the display 107.

The I/F 108 is connected to a network 111 such as a local area network (LAN), a wide area network (WAN), and the Internet through a communication line and is connected to other apparatuses through the network 111. The I/F 108 administers an internal interface with the network 111 and controls the input and output of data with respect to external apparatuses. For example, a modem or a LAN adaptor may be employed as the I/F 108.

The keyboard 109 includes, for example, keys for inputting letters, numerals, and various instructions and performs the input of data. Alternatively, a touch-panel-type input pad or numeric keypad, etc. may be adopted.

Figure 2:
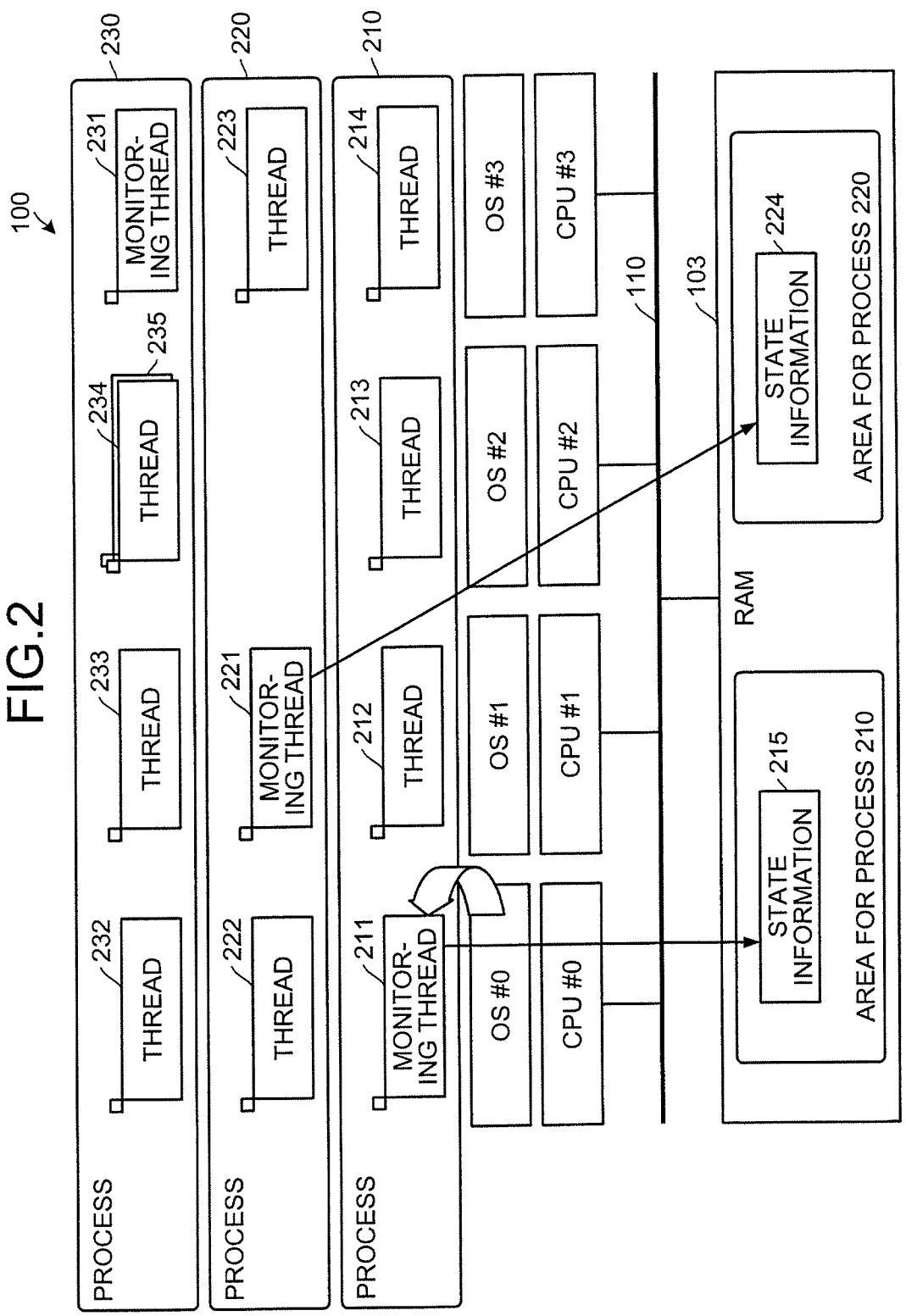
FIG. 2 is a schematic diagram depicting executed states of CPUs and processes in this embodiment.

FIG. 2 is a schematic diagram depicting executed states of CPUs and processes in this embodiment. The multi-core processor system depicted in FIG. 2 executes three processes, including a process 210, a process 220, and a process 230. The processes 210 to 230 provide specific services to the user. For example, the process 210 is a Web browser process that provides a Web service and the process 220 is a video reproduction process that plays streaming video.

To provide a specific service to the user, the processes 210 to 230 divide functions according to thread, which is a unit of program execution, to provide a single service. For example, the Web browser process has three threads, including a first thread that is for data transmission/reception in accordance with the hypertext transfer protocol (HTTP), a second thread that is for analyzing received hypertext markup language (HTML) data, and a third thread that is for displaying HTML data using the analyzed result.

Thread states include an executed state, an executable state, and a waiting state. Hereinafter, both the executed state and the executable state are referred to together as an active state. The OS has a function of selecting threads to be allocated to CPUs, from among threads in the active state and based on an OS scheduling policy such as time sharing or priority order, to cause the CPUs to execute the allocated threads. Threads that have been executed are threads in the executed state; and threads not allocated to the CPUs are threads in the executable state.

Threads in the waiting state are threads in a temporarily unexecutable state consequent to, for example, I/O response wait or execution of a sleep instruction that is an OS standby instruction. Activation of a waiting thread means that the unexecutable state is cancelled so that the state transitions from waiting to active.

The process is a unit of management in the OS and multiple threads can belong to a single process. The threads belonging to the same process can share computer resources such as memory managed by the OS. On the other hand, threads belonging to different processes do not share resources and, for example, cannot refer to the memory contents of other processes. In this manner, computer resources are independent for each of the processes so that the state information can be saved for each process.

The processes 210 to 230 have monitoring threads, a feature of this embodiment. For example, the process 210 includes a monitoring thread 211 and threads 212 to 214. The process 220 includes a monitoring thread 221 and threads 222 and 223. The process 230 includes a monitoring thread 231 and threads 232 to 235. Allocation of the threads of the processes 210 to 230 to the CPUs #0 to #3 is as follows. Allocated to the CPU #0 are the monitoring thread 211 and the threads 222 and 232. Using a function of an OS#0, the CPU #0 executes the monitoring thread 211 and the threads 222 and 232 according to the priority of the allocated threads.

Allocated to the CPU #1 are the thread 212, the monitoring thread 221, and the thread 233. Allocated to the CPU #2 are threads 213, 234, and 235. Allocated to the CPU #3 are threads 214 and 223 and the monitoring thread 231. In this manner, the multi-core processor system 100 does not allocate other threads of the same process to a CPU to which a monitoring thread is allocated.

The monitoring thread is generated when generating a process by a CPU that generates the process. The monitoring thread is periodically executed to save to the RAM 103, the state information of threads to be monitored, which are threads other than the monitoring thread, of a process to which the monitoring thread belongs. The threads to be monitored may be all or some of the threads other than the monitoring thread of the process to which the monitoring thread belongs. Hereinafter, when described simply as a thread, the thread means a thread to be monitored.

For example, the monitoring thread 211 generates state information 215 in an area for the process 210 and saves the state information 215 to the RAM 103. Similarly, the monitoring thread 221 generates state information 224 in an area for the process 220 and saves the state information 224 to the RAM 103. Similarly, although not depicted in FIG. 2, the monitoring thread 231 also generates state information in an area for the process 230 and saves the generated state information to the RAM 103.

The state information is, for example, data including, as the thread executed state, data that has changed from initial data and an address of the data. The state information also includes values of CPU registers during the thread execution. The state information further includes a case of a change in the state of the entire process as the process executed state.

A change in the state of the entire process included in the state information is a case for example where there is a change in the process priority, the amount of memory secured by the process, etc. The monitoring thread 211 saves the state information 215 to the RAM 103 and thereby, saves the state of the process 210 and the states of the threads 212 to 214. In the same manner, the monitoring thread 221 stores the state information 224 to the RAM 103 and thereby, saves the state of the process 220 and the states of the threads 222 and 223.

Figure 3:
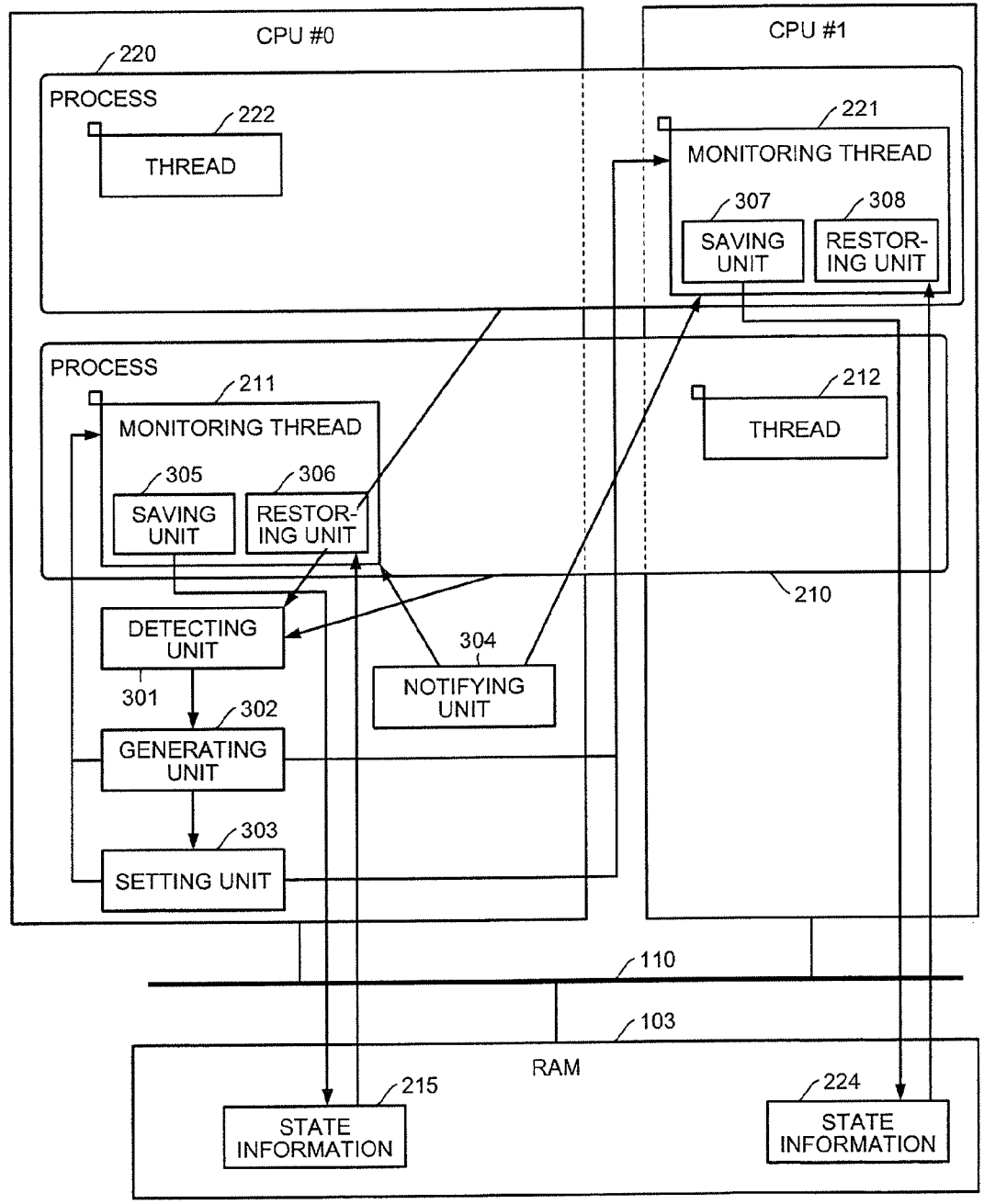
FIG. 3 is a block diagram of functions of the multi-core processor system 100.

Functions of the multi-core processor system 100 will be described. FIG. 3 is a block diagram of functions of the multi-core processor system 100. In FIG. 3, functions related to the monitoring threads will be described. The multi-core processor system 100 includes a detecting unit 301, a generating unit 302, a setting unit 303, a notifying unit 304, a saving unit 305, a restoring unit 306, a saving unit 307, and a restoring unit 308. These functions (the detecting unit 301 to the restoring unit 308) as a control unit are implemented by any one of the CPU #0 to the CPU #3 executing a program stored in a storage device. The storage device is for example the ROM 102, the RAM 103, the flash ROM 104, the flash ROM 106, etc. depicted in FIG. 1.

Although in FIG. 3, the detecting unit 301 to the restoring unit 306 are depicted as functions of the CPU #0, the detecting unit 301 to the restoring unit 306 may be functions of the CPUs #1 to #3. For example, when in a process executed by the CPU #1, there occurs a request to activate the process 220, the CPU #1 generates the process 220 and thus, the detecting unit 301 is executed as a function of the CPU #1. The saving unit 305 and the restoring unit 306 are functions included in the monitoring thread 211 and, if the monitoring unit is executed by a given CPU other than the CPU #0, the saving unit 305 and the restoring unit 306 may be functions of the given CPU. For example, the saving unit 307 and the restoring unit 308 are functions included in the monitoring thread 221 executed by the CPU #1.

The detecting unit 301 has a function of detecting the execution of a process in multiple cores. The execution of a process detected by the detecting unit 301 may be for example a case where a process is generated and executed. The execution of a process may be a case where a generated process is executed and re-executed after the reception of a save start request for the state information from the user, etc. For example, the detecting unit 301 detects that the process 210 is executed. The detection information is stored to a storage area such as a register, a cache memory, or the RAM 103 of the CPU in which the detecting unit 301 functions.

The generating unit 302 has a function of, when the execution of a process is detected by the detecting unit 301, generating a specific thread that saves state information indicating the executed state of the process and the executed states of threads to be monitored of the process. The specific thread refers to the monitoring thread. For example, when the execution of the process 210 is detected, the generating unit 302 generates the monitoring thread 211 that saves the state information 215 indicating the executed state of the process 210 and the executed states of the threads 212 to 214 that are threads to be monitored. The information generated by the monitoring thread is stored to a storage area such as a register, a cache memory, or the RAM 103 of the CPU in which the generating unit 302 functions.

The setting unit 303 has a function of setting a core that is not a core executing the threads to be monitored and that is to execute the specific thread generated by the generating unit 302. For example, the setting unit 303 sets a CPU to execute the monitoring thread 211 to be the CPU #0, which is not among the CPUs #1 to #3 executing the threads 212 to 214.

When threads to be monitored are executed at all the CPUs at the time of generation of a monitoring thread, to make available a CPU that is not executing a thread to be monitored, the setting unit 303 may migrate some of the threads to be monitored. Information of a CPU executing the monitoring thread is stored to a storage area such as a register, a cache memory, or the RAM 103 of the CPU in which the setting unit 303 functions or of the CPU executing the monitoring thread.

The notifying unit 304 has a function of sending from a core that detects a core whose restart is completed to a core other than the core whose restart is completed among the cores, a request to restore the process and the treads to be monitored to the time of saving of the state information. The notifying unit 304 is executed when any core among the cores completes the restart. The core detecting a core whose restart is completed may be the core itself whose restart is completed or may be a core other than the core whose restart is completed.

For example, if the CPU #1 completes the restart, the notifying unit 304 sends to the CPU #0, the CPU #2, and the CPU #3, excluding the CPU #1, a request to restore the process 210 and the threads 212 to 214 to the state at the point in time when the state information 215 is saved. Among the CPUs #0, #2, and #3 receiving the restoration request, the CPU performing the restoration is the CPU #0 executing the monitoring thread.

The notifying unit 304 may send from a core detecting the occurrence of a failure which is a cause of the restart in the core whose restart is completed to at least a core other than the core in which the failure occurred among the cores, a request to suspend the threads to be monitored. For example, the notifying unit 304 sends from the CPU #0 detecting the occurrence of a failure in the CPU #1 and to at least the CPU #0, CPU #2, and CPU #3, a request to suspend the threads 212 to 214.

The notifying unit 304 may send notice of the completion of restart by a CPU to CPUs other than the CPU whose restart is completed among the CPUs 101. The monitoring threads executed by the other CPUs may restore the states of the process and the threads to be monitored when receiving the notice of restart completion. Similarly, the notifying unit 304 may send notice of the occurrence of a failure at a CPU to at least a CPU other than the CPU in which the failure occurred among the CPUs 101. The monitoring threads executed by the other CPUs may suspend the threads to be monitored when receiving the notice of the occurrence of a failure.

The saving units 305 and 307 have a function of saving state information indicating the executed state of a process and the executed state of threads to be monitored of the process. For example, the saving unit 305 saves the state information 215 indicating the executed state of the process 210 and the executed state of the threads 212 to 214 which are threads to be monitored. The saving units 305 and 307 function when the monitoring thread is periodically activated.

The restoring units 306 and 308 have a function of restoring a process and threads to be monitored to the state at the point in time when the state information is saved, upon receipt of a restoration request from the notifying unit 304. For example, the restoring unit 306 restores the process 210 and the threads 212 to 214, which are threads to be monitored, to the state at the point in time when the state information 215 is saved. The restoring units 306 and 308 may perform the restoration upon receipt of a suspend request and a restoration request from the notifying unit 304.

Figure 4:
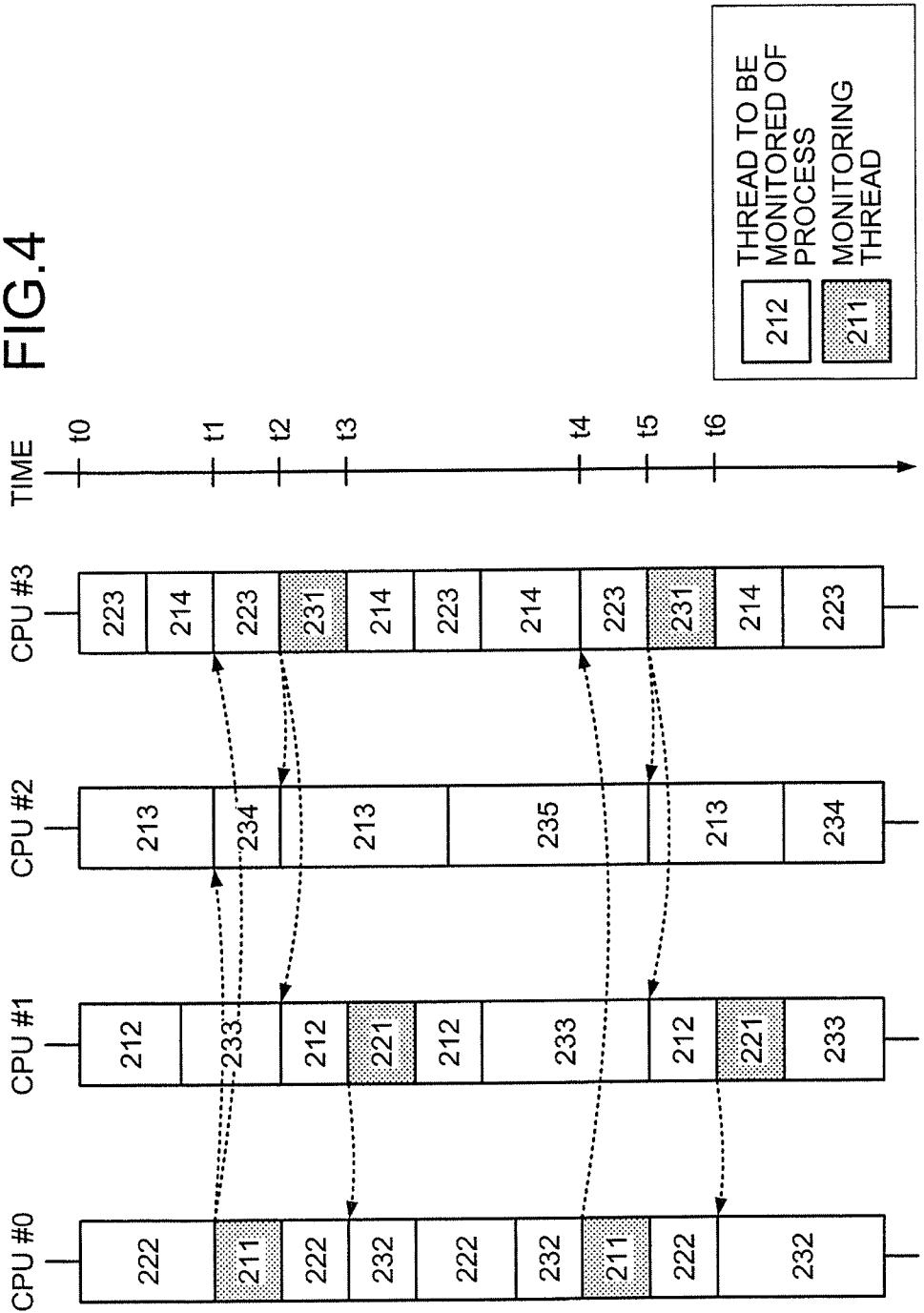
FIG. 4 is a schematic view of the timing at which the state information is saved by a monitoring thread during normal operation.

FIG. 4 is a schematic view of the timing at which the state information is saved by the monitoring thread during normal operation. From time t0 to time t1, the CPU #0 executes the thread 222, the CPU #1 executes the threads 212 and 233, the CPU #2 executes the thread 213, and the CPU #3 executes the threads 223 and 214. When the CPU #0 executes the monitoring thread 211 at time t1, the function of the monitoring thread 211 allows the CPU #0 to suspend the thread 213 being executed by the CPU #2 and the thread 214 being executed by the CPU #3. After suspension of the threads 213 and 214, the function of the monitoring thread 211 causes the CPU #0 to acquire and save differences of data written by the threads 212 to 214 of the process 210 executed from time t0 to time t1.

From time t1 to time t2, the CPU #0 executes the monitoring thread 211, the CPU #1 executes the thread 233, the CPU #2 executes the thread 234, and the CPU #3 executes the thread 223. When the CPU #3 executes the monitoring thread 231 at time t2, the function of the monitoring thread 231 allows the CPU #3 to suspend the thread 233 being executed by the CPU #1 and the thread 234 being executed by the CPU #2. After the suspension of the threads 233 and 234, the function of the monitoring thread 231 causes the CPU #3 to acquire and save differences of data written by the threads 233 and 234 of the process 230 executed from time t0 to time t2.

From time t2 to time t3, the CPU #0 executes the thread 222, the CPU #1 executes the thread 212, the CPU #2 executes the thread 213, and the CPU #3 executes the monitoring thread 231. When the CPU #1 executes the monitoring thread 221 at time t3, the function of the monitoring thread 221 allows the CPU #1 to suspend the thread 222 being executed by the CPU #0. After the suspension of the thread 222, the function of the monitoring thread 221 allows the CPU #1 to acquire and save differences of data written by the threads 222 and 223 of the process 220 executed from time t0 to time t3.

From time t3 to time t4, the CPU #0 executes the threads 232 and 222 and the CPU #1 executes the monitoring thread 221 and the threads 212 and 233. The CPU #2 executes the threads 213 and 235 and the CPU #3 executes the threads 214 and 223. When the CPU #0 executes the monitoring thread 211 at time t4, the function of the monitoring thread 211 allows the CPU #0 to suspend the thread 214 being executed by the CPU #3. After the suspension of the thread 214, the function of the monitoring thread 211 allows the CPU #0 to acquire and save differences of data written by the threads 212 to 214 of the process 210 executed from time t2 to time t4.

Similarly, at time t5, the function of the monitoring thread 231 allows the CPU #3 to acquire and save differences of data written by the threads 232, 233, and 235 of the process 230 executed from time 3 to time 5. At time t6, the function of the monitoring thread 221 allows the CPU #1 to acquire and save differences of data written by the threads 222 and 223 of the process 220 executed from time 3 to time 5.

In this manner, even when a monitoring thread is performing storage, threads of another process are executable, enabling throughput of the CPUs to be effectively utilized. The monitoring thread is automatically inserted by the OS, so that the program of each process need not be altered.

Figure 5:
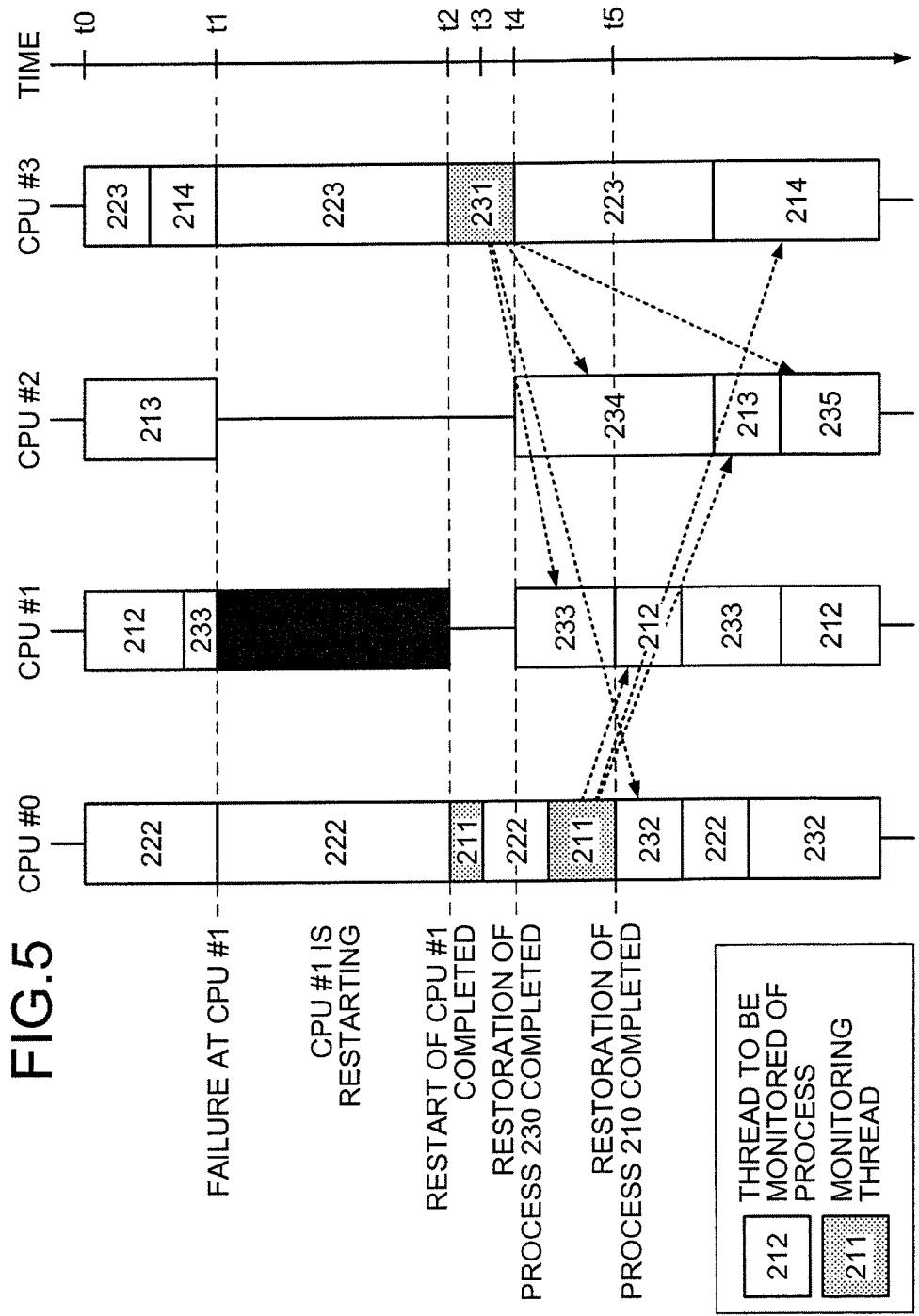
FIG. 5 is a schematic view of the operation of the multi-core processor system 100 upon the occurrence of a failure.

FIG. 5 is a schematic view of the operation of the multi-core processor system 100 upon the occurrence of a failure. The multi-core processor system 100 depicted in FIG. 5 assumes a case where a failure occurs at the CPU #1 at time t1 depicted in FIG. 4. When a failure occurs at the CPU #1 at time t1, the CPU #0 suspends the threads 213 and 214 by the monitoring thread 211, which has received notice of the occurrence of the failure. Furthermore, the CPU #3 suspends the threads 232 to 235 by the monitoring thread 231. A schematic of thread suspension upon the occurrence of a failure will be described later in FIG. 6.

From time t1 to time t2 when the CPU #1 completes the restart, the CPU #0 executes the thread 222 and the CPU #3 executes the thread 223. The CPU #2 pauses due to the absence of an executable thread. When the restart of the CPU #1 is completed at time t2, the processes 210 and 230 are restored by the monitoring threads 211 and 231, which have been activated by a restart completion mode. For example, the monitoring thread 211 restores the threads 212 to 214 and the monitoring thread 231 restores the threads 232 to 235.

The CPU #1 subject to the failure refers to management information of the other OSs and determines the absence of a monitoring thread in the process 220 from a list of currently operating processes and monitoring threads allocated to the other OSs, and generates the monitoring thread 221. When the CPU #0 detects at time t3 that the thread 222 has a higher priority than the restoration process of the monitoring thread 211, the CPU #0 saves the monitoring thread 211 and executes the thread 222. In this manner, if a thread has a higher priority, the thread can interrupt the restoration process.

When the restoration of the process 230 is completed at time t4, the threads 232 to 235 become executable. The CPUs #0 to #3 execute threads based on the priority, etc., among the threads 232 to 235 and other executable threads. For example, the CPU #0 executes the thread 222 continuously from time t3, the CPU #1 executes the thread 233, the CPU #2 executes the thread 234, and the CPU #3 executes the thread 223.

Subsequently, when the restoration of the process 210 is completed at time t5, the threads 212 to 214 become executable. The CPUs #0 to #3 execute threads based on the priority, etc., among the threads 212 to 214 and other executable threads. For example, the CPU #0 executes the thread 232, the CPU #2 executes the thread 234 continuously from time t4, and the CPU #3 executes the thread 223 continuously from time t4.

In FIG. 5, the restoration process of the process 210 is performed by the CPU #0 executing the monitoring thread 211 and the restoration process of the process 230 is performed by the CPU #3 executing the monitoring thread 231. In this manner, by allocating the monitoring threads to different CPUs, the multi-core processor system 100 can distribute the restoration process among multiple CPUs upon the occurrence of a failure without centralizing the restoration process at a single CPU.

Figure 6:
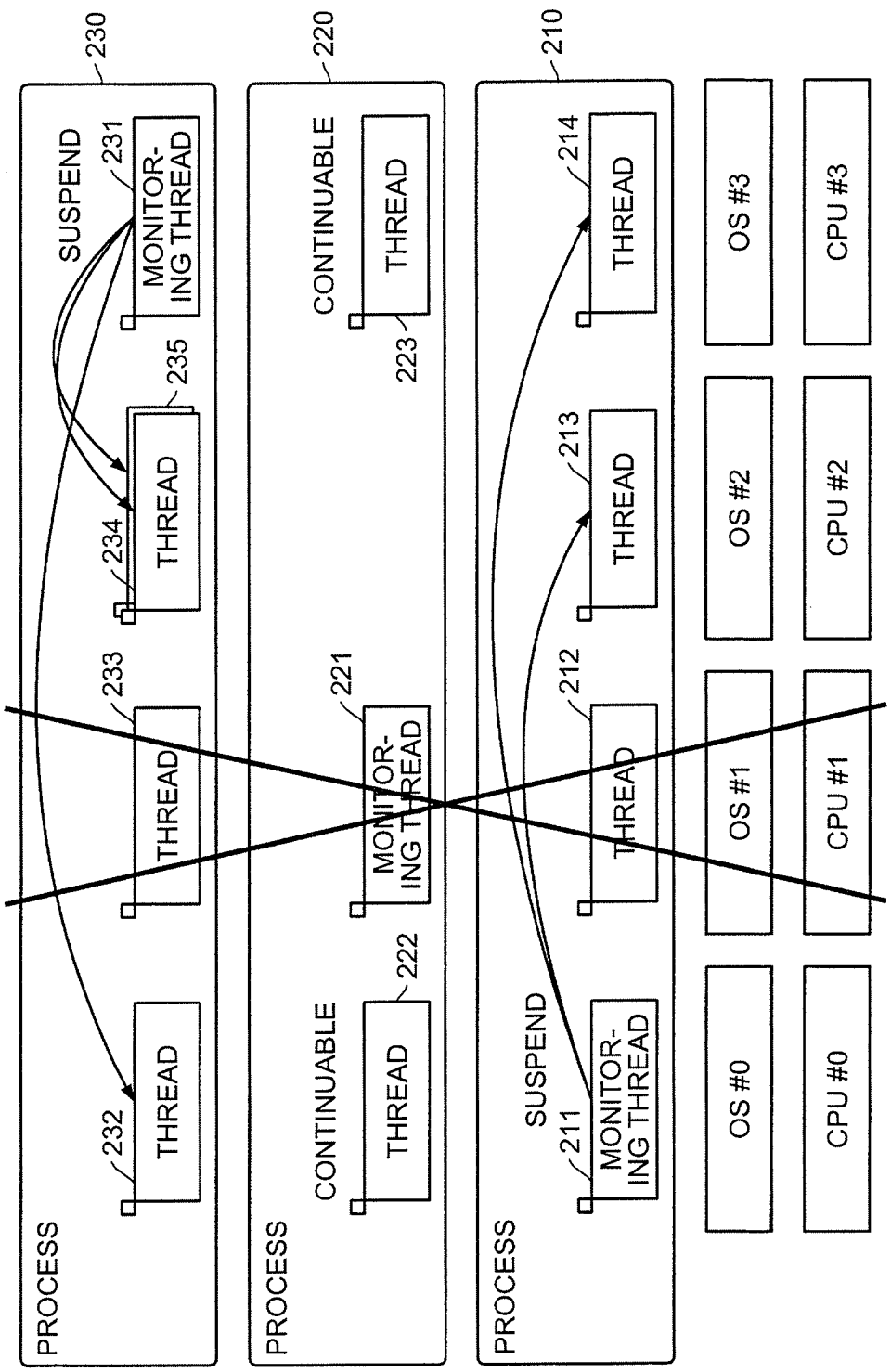
FIG. 6 is a schematic diagram depicting a process that can be continued upon the occurrence of a failure.

FIG. 6 is a schematic diagram depicting a process that can be continued upon the occurrence of a failure. FIG. 6 assumes a case where a failure occurs at the CPU #1. When a failure occurs at the CPU #1, the monitoring thread of the process suspends the other threads. Subsequently, after the completion of the restart of the CPU #1, the monitoring thread performs the restoration process. For example, the CPU #0 suspends the threads 213 and 214 by the monitoring thread 211. Furthermore, the CPU #3 suspends the threads 232, 234, and 235 by the monitoring thread 231. The threads 222 and 223 of the process 220 can be continued without any need to perform the restoration process.

In this manner, a given process can continue to operate without performing the restoration process. The given process refers to a process allocated to a CPU subject to a failure and allocated a monitoring thread. For example, as an example different from the example depicted in FIG. 6, if a failure occurs in the CPU #0, the threads 212 to 214 of the process 210 can continue to operate.

Figure 7:
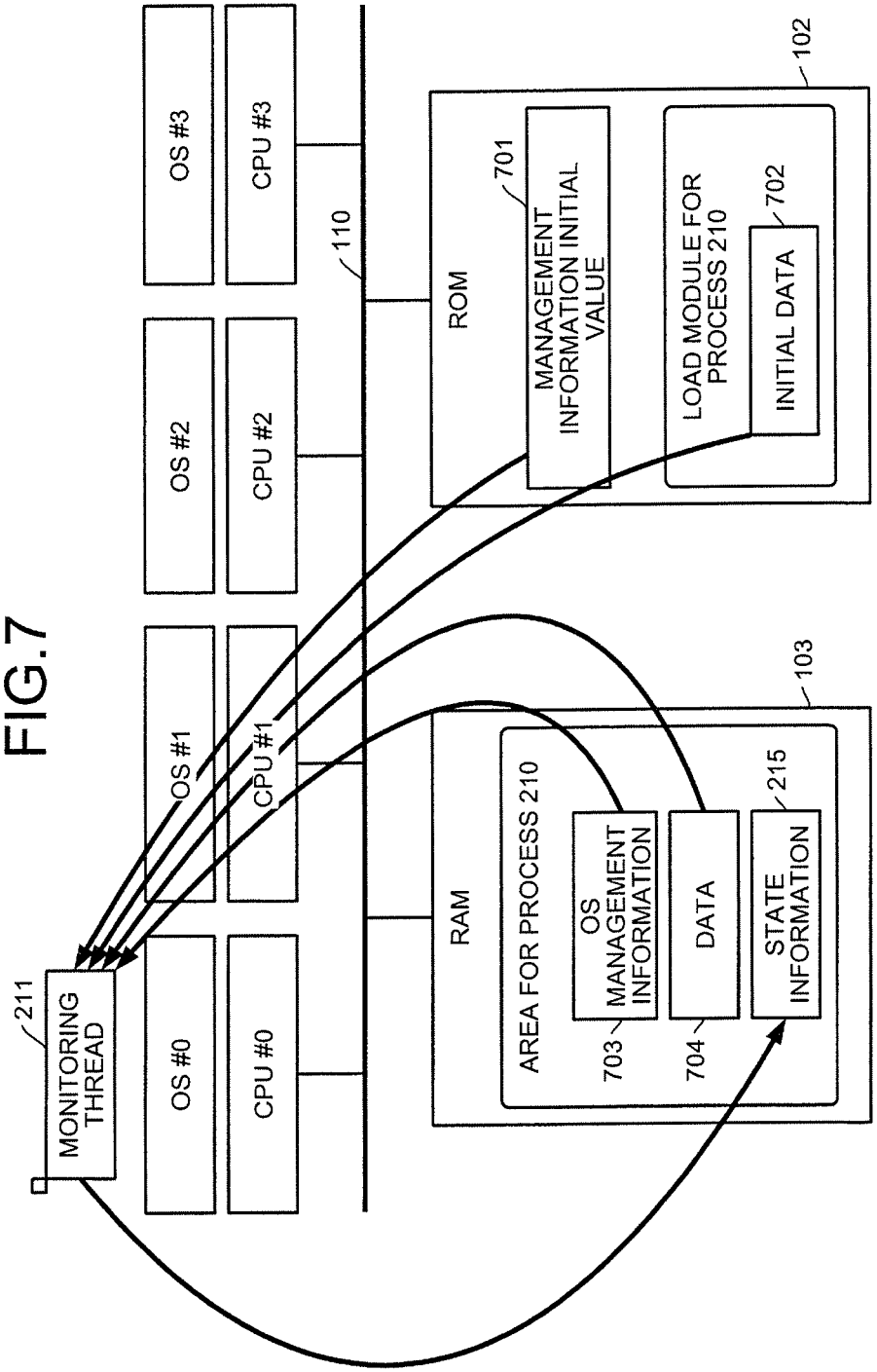
FIG. 7 is a schematic diagram depicting saving of state information 215 by a monitoring thread 211.

FIG. 7 is a schematic diagram depicting saving of the state information 215 by the monitoring thread 211. The ROM 102 stores a management information initial value 701 and a load module for the process 210. The load module for the process 210 stores initial data 702 concerning the process 210. The management information initial value 701 and the load module for the process 210 may be stored in the RAM 103, the flash ROM 104, etc.

The RAM 103 establishes an area for the process 210 which stores therein OS management information 703, data 704, and the state information 215. The OS management information 703 includes management information concerning processes and threads managed by the OS#1. The data 704 includes data accessed by the threads 212 to 214. The management information initial value 701 to the data 704 will be described in detail with reference to FIG. 10.

Using the function of the monitoring thread 211, the CPU #0 refers to the management information initial value 701, the initial data 702, the OS management information 703, and data 704 and outputs and stores to the RAM 103, the state information 215. For example, the CPU #0 compares the initial data 702 and the data 704 and, if the data 704 changes from the initial data 702, outputs the data 704 to the state information 215. In the same manner, the CPU #0 compares the management information initial value 701 and the OS management information 703 and, if the OS management information 703 changes from the management information initial value 701, outputs the OS management information 703 to the state information 215.

Figure 8:
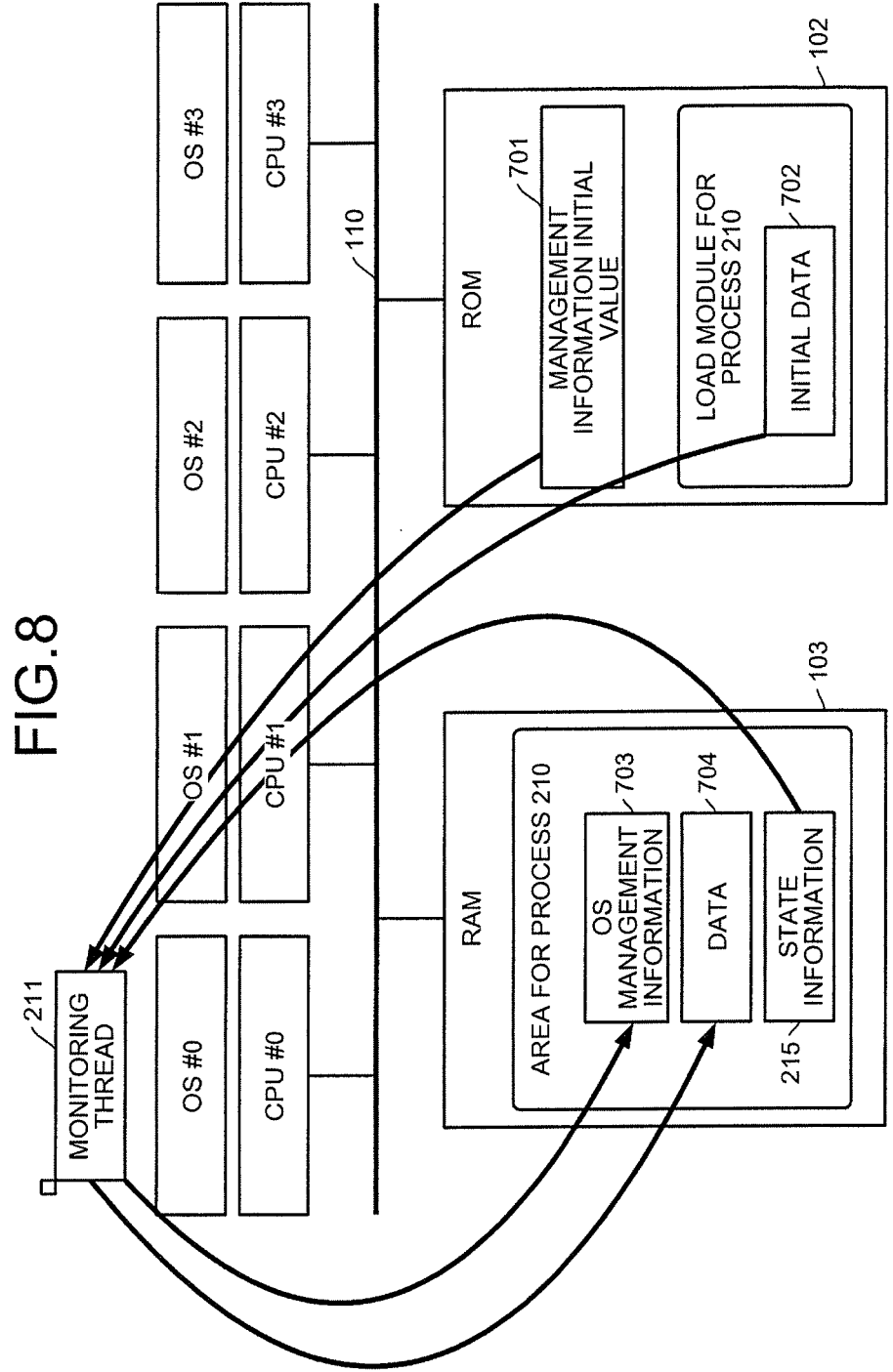
FIG. 8 is a schematic diagram depicting state restoration using the state information 215 by the monitoring thread 211.

FIG. 8 is a schematic diagram depicting state restoration using the state information 215 by the monitoring thread 211. A failure is assumed to have occurred at any one of the CPUs #1 to #3, excluding the CPU #0 and the restart of the CPU subject to the failure is assumed to be completed. At this time, using the function of the monitoring thread 211, the CPU #0 refers to the management information initial value 701, the initial data 702, and the state information 215, and updates the OS management information 703 and the data 704.

For example, using the initial data 702 and the state information 215, the CPU #0 returns the data 704 accessed by the threads 212 to 214 to the state at the point in time when the state information 215 is stored. Similarly, using the management information initial value 701 and the state information 215, the CPU #0 returns the state of the process 210 to the state at the point in time when the state information 215 is stored.

Specific authorization may be required for the acquisition and restoration of the process management information and the thread management information described in FIGS. 7 and 8. In such a case, the multi-core processor system 100 imparts the specific authority to a monitoring thread when the monitoring thread is generated.

Figure 9:
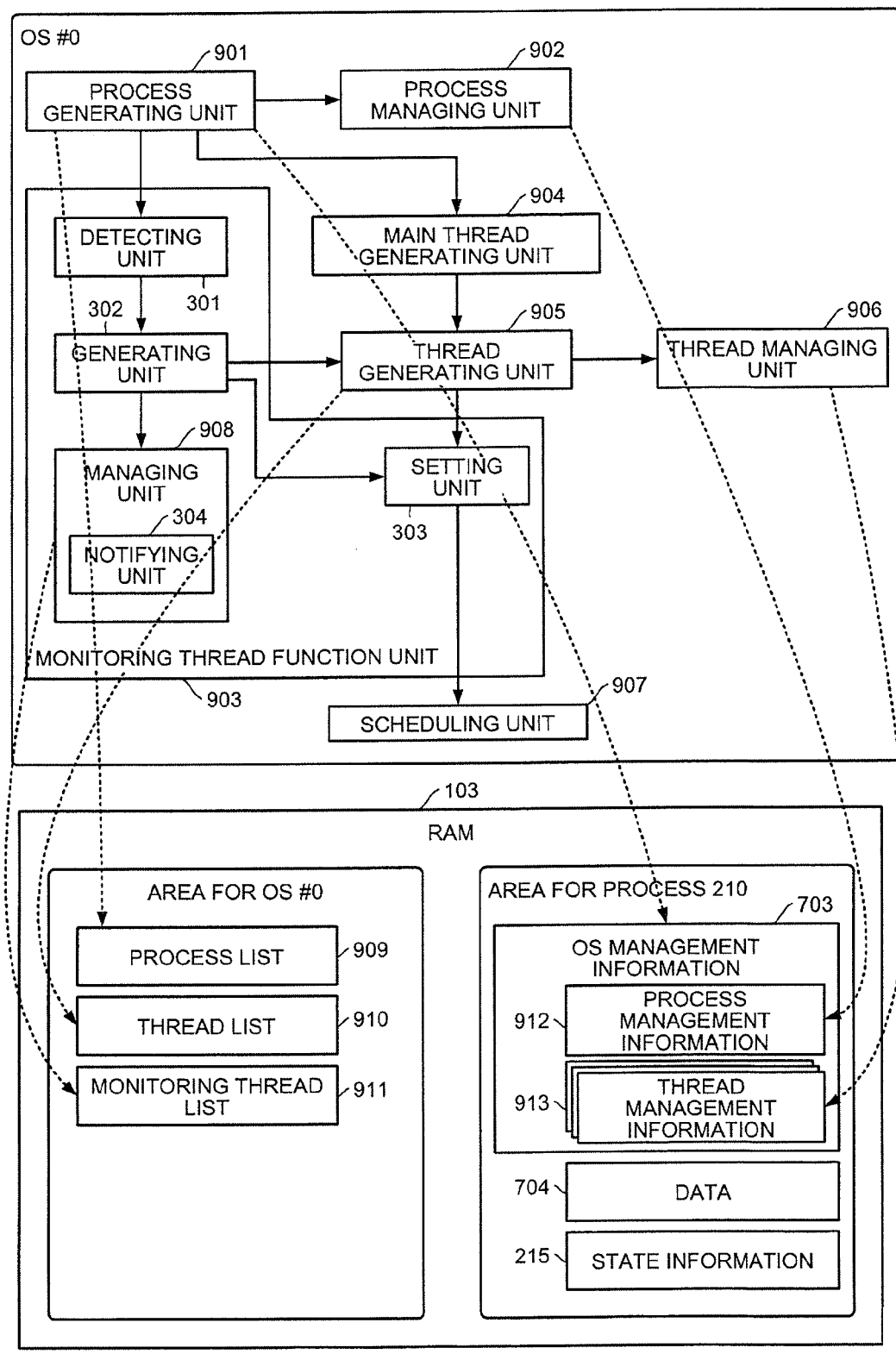
FIG. 9 is a schematic view of an internal function of the OS.

FIG. 9 is a schematic view of an internal function of the OS. In FIG. 9, description will be given taking the OS#0 as an example. The OS#1 to OS#3, excluding the OS#0, also have a similar function. Although in FIG. 3, functions related to the monitoring thread have been described, functions related to the processes and threads overall will be described with reference to FIG. 9. The OS#0 includes a process generating unit 901, a process managing unit 902, a monitoring thread function unit 903, a main thread generating unit 904, a thread generating unit 905, a thread managing unit 906, and a scheduling unit 907. The monitoring thread function unit 903 includes the detecting unit 301, the generating unit 302, a managing unit 908, and the setting unit 303. The managing unit 908 includes the notifying unit 304.

The RAM 103 establishes an area for the OS#0 and areas for processes 210 to 230. In FIG. 9, among the areas for processes 210 to 230, the area for the process 210 is depicted as an example. The area for the OS#0 stores a process list 909, a thread list 910, and a monitoring thread list 911. The area for the process 210 stores the OS management information 703, the data 704, and the state information 215 as depicted in FIG. 7. The OS management information 703 stores process management information 912 and thread management information 913.

The process generating unit 901 has a function of receiving a request from the user or a process to generate a new process. For example, if the OS#0 is Linux (registered trademark), the process generating unit 901 generates a process in response to a request from an init process. The generated process is stored in the process list 909. The process generating unit 901 establishes on the RAM 103, a data area for the generated process.

The process managing unit 902 has a function of managing the process generated by the process generating unit 901. For example, the process managing unit 902 stores in the process management information 912 information such as the process priority, the memory size established for the process, an argument for the generated process, etc.

The monitoring thread function unit 903 is a group of functions for the monitoring threads. For example, using the detecting unit 301, the monitoring thread function unit 903 detects the generation of a process and generates a monitoring thread. Using the setting unit 303, the monitoring thread function unit 903 then sets a CPU to which the monitoring thread is allocated and uses the notifying unit 304 to send an instruction to the monitoring thread.

The main thread generating unit 904 has a function of generating a main thread from the start position of a program code when a process is generated by the process generating unit 901. The head of a main ( ) function for example is at the start position of the program code. In the case of Windows (registered trademark), the head of a WinMain ( ) function is at the start position of the program code. The main thread generating unit 904 is set so as to start the execution of the main thread from the above function.

The thread generating unit 905 has a function of generating a thread. For example, when a request to generate a new thread is issued from the main thread, the thread generating unit 905 generates a thread. Stored in the thread list 910 are the threads generated by the generating unit 302 of the monitoring thread function unit 903, the main thread generating unit 904, and the thread generating unit 905.

The thread managing unit 906 has a function of managing the generated threads. For example, the thread managing unit 906 determines to which process a generated thread belongs and stores the generated thread in the thread management information 913, within the data area for the corresponding process. For example, the thread managing unit 906 stores management information into the thread management information 913, the management information being information such as a value indicating whether the thread is active or waiting, the priority of the thread, the memory size established for the thread and an argument for the generated thread.

The scheduling unit 907 has a function of allocating threads whose allocation CPU is set, to the CPU based on the priority, time sharing, etc. For example, the scheduling unit 907 allocates the monitoring thread 211 and the threads 211, 222, and 232, which are set to be allocated to the CPU #0, to the CPU #0 in a sequence based on priority, time sharing, etc.

The managing unit 908 has a function of managing the monitoring threads. For example, the managing unit 908 stores into the monitoring thread list 911, a monitoring thread generated by the generating unit 302. Furthermore, by way of the notifying unit 304, the managing unit 908 issues to a monitoring thread indicated in the monitoring thread list 911, an instruction to restore the state information.

The process list 909, the thread list 910, and the monitoring thread list 911 are lists for storing processes, threads, and monitoring threads, respectively. For example, pointers to the processes, threads, and monitoring threads are stored therein.

The process management information 912 is information such as the priority of a process, the memory size established for the process, and an argument for the generated process. Such information may be changed during the time that the process is being executed. For example, assuming that the process is a Web browser process providing a Web service and that the user, etc., issues a request to browse plural Web pages but cannot browse the plural Web pages with the memory capacity preliminarily established. At this time, the multi-core processor system 100 expands the memory capacity of the process 210. If the memory capacity is successfully expanded, the multi-core processor system 100 writes the expanded memory size into the process management information 912.

The thread management information 913 is information such as a value indicating whether the thread is active or waiting, the priority of the thread, the memory size established for the thread, and an argument for the generated thread. Such information is changed upon execution, similar to the process management information 912. For example, if the thread priority or the established memory size changes, the multi-core processor system 100 writes the resulting value into the thread management information 913.

Figure 10:
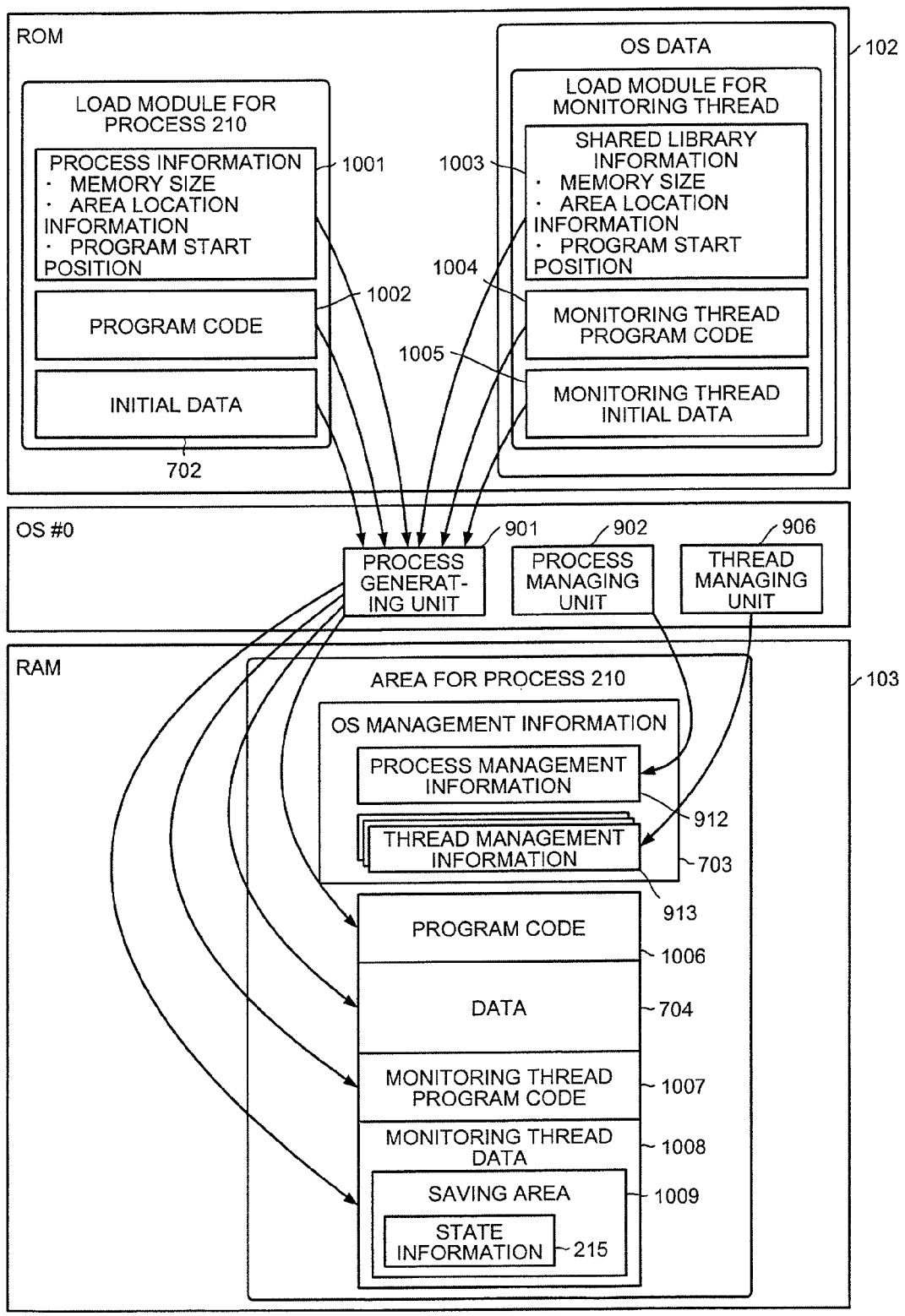
FIG. 10 is a schematic view of a generation example of storage contents of an area for a process.

FIG. 10 is a schematic view of a generation example of storage contents of an area for a process. FIG. 10 depicts generation of the area for the process 210. A load module for the process 210 is an execution file that when executed, generates a process. The load module for the process 210 stores process information 1001 and a program code 1002 in addition to the initial data 702 depicted in FIG. 7.

The process information 1001 includes the memory size, area location information and a program start position. The program code 1002 stores a code that is obtained by converting a source program into machine language. For example, if the load module for the process 210 is of the executable and linkable format (ELF), the process information 1001 is stored into a header section such as the ELF header. Similarly, the program code 1002 is stored to a text section and the initial data 702 is stored to a data section.

The ROM 102 stores a load module for the monitoring threads as a part of the data for the OS. The load module for the monitoring threads is a shared library that is available to the modules. The load module for the monitoring threads stores shared library information 1003, monitoring thread program code 1004, and monitoring thread initial data. The content stored in the shared library 1003 is equivalent to the process information 1001.

For example, the shared library information 1003 stores the memory size, area location information, and program start position, of a monitoring thread. The monitoring thread program code 1004 stores code that is obtained by converting into machine language, a source program corresponding to the monitoring thread. The monitoring thread initial data 1005 stores an initial value of the monitoring thread. If the load module for the monitoring thread is also of the ELF format, the shared library information 1003 is stored into the header section such as the ELF header. Similarly, the monitoring thread program code 1004 is stored in the text section and the monitoring thread initial data 1005 is stored in the data section.

Referring to the initial data 702 and the process information 1001 to the monitoring thread initial data 1005, the process generating unit 901 deploys code to the area for the process 210. For example, the process generating unit 901 deploys the program code 1002 to an area for program code 1006 on the RAM 103 and deploys the initial data 702 to an area for the data 704 on the RAM 103. In the same manner, the process generating unit 901 deploys the monitoring thread program code 1004 to an area for monitoring thread program code 1007 on the RAM 103 and deploys the monitoring thread initial data 1005 to an area for monitoring thread data 1008 on the RAM 103. In the area for the monitoring thread data 1008, a saving area 1009 for saving the state information 215 is established.

Figure 11:
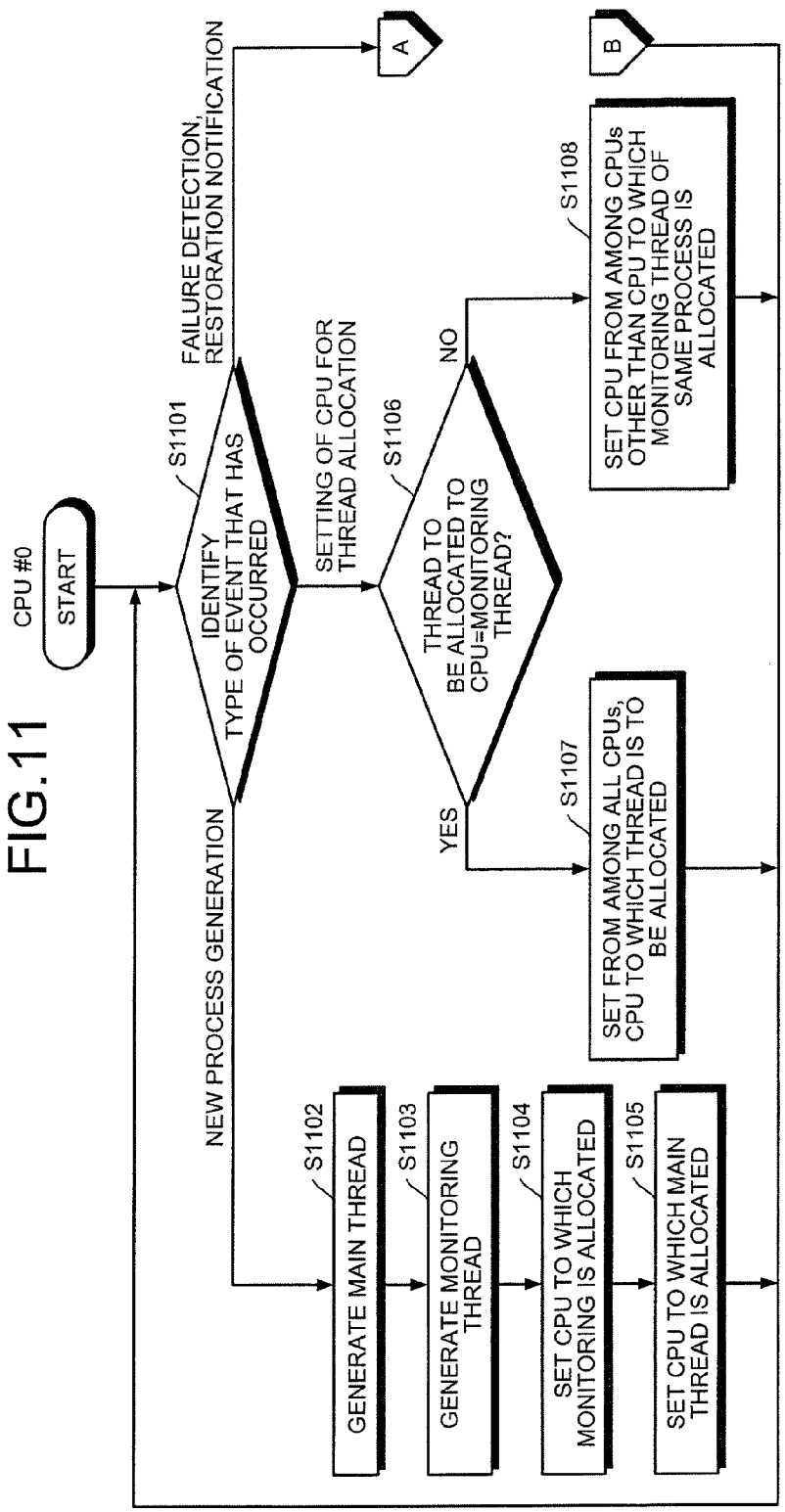
FIG. 11 is a flowchart (1) of an event process performed by an OS.

Using the group of functions depicted in FIG. 9 and the area for the process depicted in FIG. 10, the multi-core processor system 100 performs the saving process and the restoration process of the state information. FIGS. 11 and 12 depict event processes performed by an OS and FIGS. 13 and 14 explain a saving process and a restoration process performed by the monitoring thread. The saving process and the restoration process by the monitoring thread are executed by the OS sending notice to a monitoring thread in the event processes.

FIG. 11 is a flowchart (1) of the event process performed by an OS. The event process by an OS is executed by any one of the CPUs #0 to #3, but in FIGS. 11 and 12, the event process is assumed to be executed by the CPU #0 using the function of the OS#0. FIG. 11 explains an event to generate a new process and an event to set a CPU to which a thread is allocated.

The CPU #0 identifies the type of event that has occurred (step S1101). For example, the CPU #0 acquires an oldest message among messages stored in an event queue. If the event is generating a new process (step S1101: new process generation), the CPU #0 generates a main thread (step S1102). After the generation of the main thread, the CPU #0 generates a monitoring thread (step S1103). After the generation of the monitoring thread, the CPU #0 sets a CPU to which the monitoring is allocated (step S1104).

For example, the CPU #0 generates a message including a pointer to the generated monitoring thread and an event ID indicating the CPU to which the thread is allocated and stores the message to the event queue. As a result of the acquisition of the stored message, the CPU #0 executes operation at steps S1106 to S1108, thereby making it possible to set a CPU to which the monitoring thread is allocated.

Subsequently, the CPU #0 sets a CPU to which the main thread is allocated (step S1105) and goes to the operation at step S1101. The main thread and the monitoring thread having been allocated to CPUs are set to start execution from the start positions of the respective programs and become active. At the same time, the monitoring thread stores to a monitoring thread list of the OS of the CPU, identification information concerning the monitoring thread, e.g., a pointer to the monitoring thread. Details of the operation of the monitoring thread will be described later with reference to FIGS. 13 and 14.

If the event is setting of a CPU to which a thread is allocated (step S1101: setting of CPU for thread allocation), the CPU #0 determines whether the thread to be allocated to a CPU is a monitoring thread (step S1106). If the thread is a monitoring thread (step S1106: YES), the CPU #0 sets a CPU to which the thread is to be allocated, from among all the CPUs, i.e., CPUs #0 to #3 (step S1107). At step S1107, the CPU #0 may allocate a monitoring thread to a CPU having the least number of monitoring threads allocated thereto, among all of the CPUs. This enables the multi-core processor system 100 to distribute the restoration process among multiple CPUs after the occurrence of a failure.

If the thread is not a monitoring thread (step S1106: NO), the CPU #0 sets a CPU from among CPUs other than a CPU to which a monitoring thread of the same process is allocated (step S1108). After the completion of the steps S1107 and 1108, the CPU #0 goes to the operation at step S1101.

FIG. 12 is a flowchart (2) of the event process performed by the OS. FIG. 12 explains among event processes performed by the OS, an event to detect the occurrence of a failure and an event giving notification of the restoration. FIG. 12 further explains a monitoring thread restoration process at a CPU where a failure occurs, according to the detection of the failure.

If the event is a detection of a failure (step S1101: failure detection, restoration), the CPU #0 reboots a CPU #N where the failure occurred (step S1201) and notifies a CPU where no failure occurs of the detection of the failure (step S1202). N is an integer from 0 to 3.

At step S1202, the CPU #0 may notify all of the CPUs #0 to #3, including the CPU #N where the failure occurred, of the detection of a failure occurrence. Even if the CPU #N is notified, the CPU #N is under failure and cannot receive the notice, which is discarded and does not affect operation. Employment of a method of notifying the CPUs where no failure occurs advantageously eliminates the need for the multi-core processor system 100 to perform useless communication. Employment of a method of notifying all of the CPUs advantageously eliminates the need for the multi-core processor system 100 to perform the process of excluding the CPU #N where the failure occurred, from among the CPUs when setting a group of CPUs to be notified.

A failure occurrence detection method is, for example, a method of making arithmetic circuits within the CPU redundant for the soft error and detecting as a failure occurrence when results output from the respective circuits are different. Another method is a method of periodically sending a survival check signal to the processes and threads for program bugs from the OS and detecting as a failure occurrence when a response from the process or the thread is absent.

Depending on the respective methods, the above failure detection methods include, a case where a CPU having a failure detects the failure, a case where two CPUs mutually monitor and detect a failure, and a case where one of multiple CPUs representatively detects the failure. In any of the failure detection methods, at the operation at step S1201, the CPU detecting a failure reboots the CPU where the failure occurs.

After the notification, the CPU #0 in a failure occurrence mode, activates all of the monitoring threads allocated to the CPU #0 (step S1203), and goes to the operation at step S1101. All of the monitoring threads allocated to the CPU #0 refer to threads stored in the monitoring thread list 911. In the failure occurrence mode, the CPU having a detected failure also activates all of the monitoring threads stored in the monitoring thread list 911. Operations of the monitoring threads activated in the failure occurrence mode will be described later with reference to FIG. 13.

The CPU #N having a failure restarts in response to a reboot instruction from the CPU #0, and after the completion of the restart, sends restoration notification to the other CPUs (step S1204). After the sending, the CPU #N determines whether there exists a process having no monitoring thread (step S1205). For example, the CPU #N refers to the management information of the other OSs to acquire currently active processes and the monitoring thread lists 911 allocated to the other OSs, thereby making it possible to determine whether there exists a process having no monitoring thread.

If there exists a process having no monitoring thread (step S1205: YES), the CPU #N generates a monitoring thread and allocates the thread to the CPU #N (step S1206). If a process having no monitoring thread is absent (step S1205: NO) or after the completion of the operation at step S1206, the CPU #N brings the restoration process to an end.

If the event is restoration notification (step S1101: restoration notification), in the restart completion mode, the CPU #0 activates all of the monitoring threads allocated to the CPU #0 (step S1207). The restoration notification event occurs when the CPU #N sends the restoration notification to the other CPUs at the operation at step S1204. Operations of the monitoring threads activated in the restart completion mode will be described later with reference to FIG. 14.

At this time, a CPU detecting a failure or a CPU having a detected failure may execute living threads, instead of the restoration by the monitoring thread. The threads living upon the failure occurrence mean that they are not suspended by the monitoring thread and show that the monitoring thread is executed in a CPU where a failure occurs. Due to no need for the restoration of the monitoring thread, threads belonging to a process executing the monitoring thread in a CPU having a failure can continue to be processed without being restored. For example, if the priority of the threads that can be continues and do not require restoration is higher than the priority of the monitoring thread activated by the restart completion mode, the CPU #0 may preferentially process the process threads that can be continued.

FIG. 13 is a flowchart (1) of the operations of the monitoring thread. Although the monitoring thread is executed at any one of the CPUs #0 to #3, in FIGS. 13 and 14, the monitoring thread is assumed to be executed at the CPU #0. Among the operations of the monitoring thread when a failure occurs, when the sleep timer is up, and when the restart is completed, FIG. 13 explains the operations upon a failure. As for a discrimination method of the operations of the monitoring thread, the CPU #0 can discriminate the operations by referring to a restoration value of restoration from sleep.

The CPU #0 activates a monitoring thread (step S1301). Thereafter, the CPU #0 executes a process based on program code of the monitoring thread. Subsequently, the CPU #0 acquires the initial data 702 from the area for the process to which the monitoring thread belongs (step S1302). After the acquisition of the initial data 702, the CPU #0 establishes the saving area 1009 (step S1303). For example, the CPU #0 establishes the saving area 1009 of a size sufficient to save all of the initial data 703. After the establishment, the CPU #0 sets the sleep expiration time to the normal period (step S1304) and sleeps (step S1305).

Subsequently, when activated from the sleep, the CPU #0 determines whether the CPU #0 is activated in the failure occurrence mode (step S1306). If activated in the failure occurrence mode (step S1306: YES), the CPU #0 suspends all of the threads except the monitoring thread of the process (step S1307). The CPU #0 then sets the sleep expiration time to "indefinite" (step S1308) and goes to the operation at step S1305. By setting the expiration time to indefinite, timer-up activation does not occur. The operations when not activated in the failure occurrence mode (step S1306: NO) will be described later with reference to FIG. 14.

FIG. 14 is a flowchart (2) of the operations of the monitoring thread. FIG. 14 will explain the operations when the timer is up and when the restart is completed, among the operations of the monitoring thread. The operation upon the timer expiration is a state saving process and the operation upon the restart completion is a state restoration process.

If not activated in the failure occurrence mode (step S1306: NO), the CPU #0 determines whether the CPU #0 is activated in the restart completion mode (step S1401). If activated by the timer expiration set in the operation at step S1304 (step S1401: NO), the CPU #0 acquires all of the threads of the process (step S1402). The CPU #0 then suspends all of the threads except the monitoring thread of the process (step S1403). After the suspension of the threads, the CPU #0 acquires an area for a process currently used by the process (step S1404).

After the acquisition, the CPU #0 determines whether the acquired data area falls within the saving area 1009 (step S1405). If the data does not fall within the saving area 1009 (step S1405: NO), the CPU #0 establishes an extended saving area 1009 (step S1406). The case where the data does not fall within the saving area 1009 is for example a case where, as a result of execution of a memory establishment instruction in the monitoring thread, the memory area increases, which becomes an object of the state information or a case where the value is set to a variable having no initial value, which becomes an object of the state information. A specific example of the variable having no initial value is a variable stored in a .bss section in the case of the ELF format.

If the data falls within the saving area 1009 (step S1405: YES) or after the completion of the operation at step S1406, the CPU #0 saves differences of the data 704 for the process to the saving area 1009 (step S1407). The CPU #0 then saves differences of the process management information 912 and differences of the thread management information 913 to the saving area 1009 (step S1408).

Assuming that a failure occurs in one of the CPUs #1 to #3 during the state saving process from the steps S1402 to S1408 and that a failure occurrence mode activation instruction is executed by the OS#0 in step S1203, in this case, at least upon the state saving, the threads of the process remain suspended by the step S1403 and are not affected by the failure, with the result that the CPU #0 continues the state saving while leaving pending the activation instruction issued by the failure occurrence mode. After the completion of the step S1408, the failure occurrence mode activation is processed as soon as the monitoring thread sleeps in the operation at step S1305.

If activated in the restart completion mode (step S1401: YES), the CPU #0 acquires all of the threads of the process (step S1409). At the time of the activation in the failure occurrence mode, all of the threads except the monitoring thread remain suspended by the process of the step S1307. Configuration may be such that the CPU #0 does not suspend the threads at the time of step S1307 but instead suspends the threads after the step 1409.

After the acquisition, the CPU #0 acquires an area used by the process (step S1410) and restores the process management information 912 and the thread management information 913 from the saving are 1009 within the acquired area for the process (step S1411). The CPU #0 then restores data 704 for the process from the saving area 1009 (step S1412). For variables having no initial data, when restoring the data 704, the CPU #0 copies the data saved in the saving area 1009 unchanged onto the data 704.

After the process of the step S1408 or S1412, the CPU #0 resumes the operation of the suspended threads (step S1413) and goes to the operation at step S1304.

As described, according to the multi-core processor system, the monitoring control method, and the monitoring control program, a monitoring thread generated in a process saves the states of the process and of threads to be monitored, of the process. Thus, the multi-core processor performs the state saving for each of processes so that, while a specific core saves the state, the other cores continue the processes, thereby achieving an effective utilization of the throughput of the cores.

The multi-core processor system may set a core executing a monitoring thread to be different from one executing threads to be monitored. This enables the multi-core processor system to continue the process to which the monitoring thread belongs when a failure occurs in a core to which a monitoring thread is allocated. Accordingly, even though a core is being restarted as a result of a failure occurrence, the other cores execute processes that can be continued so that the throughput of the cores can be effectively utilized.

In the technique of Prior Art 1, a core having a failure occurrence restarts and the restoration process is performed after the completion of the restart. Therefore, active cores not having the failure occurrence can neither perform the restoration nor perform the application. According to the technique of this embodiment, even though the core having a failure occurrence is restarting, processes that can be continued, can be executed so that continuous operation can be accomplished.

In the case of the completion of the restart of any core, the multi-core processor system may send from a core detecting the core whose restart is completed to the cores other than the core whose restart is completed, a request to restore the process and the threads to be monitored, to the state where the state information is saved. This enables the multi-core processor system to execute the restoration process and the continuable processes at the state where the restoration become feasible with the completion of the restart.

The monitoring thread of a continuable process does not issue a restoration request because the monitoring thread is executed at a core whose restart is completed. Therefore, cores other than the core whose restart is completed need not perform a determination of which thread is continuable so that the restoration process effected by the monitoring thread and the continuable threads not receiving the restoration request can be executed based on the priority of the threads, etc.

When notified of a restoration request, the multi-core processor system may restore the process and the threads to be monitored to the state at the point in time when the state information is saved, by a core executing the monitoring thread. This enables the restoration of each process to be executed for each core so that, for example, by allocating multiple monitoring threads to the cores in a distributed manner, the restoration process after the occurrence of a failure can be executed in a distributed manner. By executing the restoration process at the cores in a distributed manner, the multi-core processor system can restore rapidly to the state before the occurrence of a failure.

In the case of detecting a core at which a failure occurs, the multi-core processor system may send a request to suspend the threads to be monitored to at least the cores other than the core in which a failure occurs, and after the notification of the suspend request and the restoration request, may restore the process and the threads to be monitored. This enables the multi-core processor system to execute processes that can be continued, even when the core having a failure occurrence is being restarted. The monitoring threads of the continuable processes do not issue a suspend request because the monitoring threads are executed at the core in which a failure occurs. Accordingly, the cores other than the core having a failure occurrence need not perform a determination of which thread is continuable so that the threads not being suspended can be executed as continuable threads.

At the stage of the completion of the restart after the occurrence of a failure, threads that could not be continued are restored to the state at the point in time when the state information is saved. Thus, even though the processes are performed from the occurrence of a failure to the completion of the restart, the results of the processes for that period do not remain, becoming useless. The results of the processes may lead to improper process results due to the presence of the threads being suspended with the occurrence of a failure. Accordingly, the multi-core processor system suspends the incontinuable threads at the stage of the occurrence of a failure, eliminating the need for unnecessary processes and thereby, enabling power saving.

The processes for the state saving and state restoration of the multi-core processor system are executed by the threads instead of the execution by a specific core, thereby achieving state saving and state restoration making use of the feature of the threads. For example, while performing the state saving of a specific process, the multi-core processor system enables the interrupt of a process with a higher priority than the specific process, by use of the priority of the threads. The same can apply to the state restoration. While performing the state restoration of a specific process, the multi-core processor system enables the interrupt of a process with a higher priority than the specific process. Also in the case of the presence of plural processes to be restored, the state restoration of a process with a higher priority is allowed to precede.

In the case of an OS where the priority is changeable in the threads, the monitoring thread may increase its priority than the ordinary when performing the state restoration. Assuming that a failure occurs in a core and that two monitoring threads perform the restoration process of the respective processes in another core, at this time, when the restoration process of the monitoring thread on one hand is completed, its priority returns to the normal level while the priority of the monitoring thread whose restoration process is not yet completed remains high so that the monitoring thread currently executing the restoration process is preferentially executed. In this manner, the multi-core processor system makes use of the feature of the threads to raise the priority when performing the restoration process, thereby enabling a preferential execution of the restoration process.

The monitoring control method described in the present embodiment may be implemented by executing a prepared program on a computer such as a personal computer and a workstation. The program is stored on a computer-readable recording medium such as a hard disk, a flexible disk, a CD-ROM, an MO, and a DVD, read out from the computer-readable medium, and executed by the computer. The program may be distributed through a network such as the Internet.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A multi-core processor system comprising:
   a plurality of cores that execute a process having a plurality of threads; and
   a memory accessible to the plurality of cores, wherein
   a first core of the plurality of cores generates, when the process is executed by a second core other than the first core, a monitoring thread that saves to the memory state information including an executed state of the process, and causes the second core to suspend an execution of the process before the first core executes the monitoring thread.

2. The multi-core processor system according to claim 1, further configured to send, when a core among the plurality of cores completes a restart, a restoration request to restore the process to a state at a point in time when the state information is saved to a core other than the core whose restart is completed among the cores.

3. The multi-core processor system according to claim 2, further configured to restore, when receiving the restoration request, the process by the monitoring thread to the state at the point in time when the state information is saved.

4. The multi-core processor system according to claim 3, wherein
   the first core, upon detecting an occurrence of a failure causing the restart at the core whose restart is completed, sends a suspension request to suspend the process to at least another core among the plurality of cores, and
   the first core, when receiving the suspension request and the restoration request, restores the process, by the monitoring thread, to the state at the point in time when the state information is saved.

5. A monitoring control method, the monitoring control method comprising:
   executing a process having the plurality of threads by the plurality of cores; and
   generating, by a first core of the cores, when the process is executed by a second core other than the first core, a monitoring thread that saves to a memory accessible to the cores state information including an executed state of the process, and causing, by the first core of the cores, the second core to suspend an execution of the process before the first core executes the monitoring thread.

6. A non-transitory computer-readable recording medium storing computer executable code, comprising:
   code for executing a process having a plurality of threads by the plurality of cores; and
   code for generating, by a first core of the cores, when the process is executed by a second core other than the first core, a monitoring thread that saves to a memory accessible to the cores state information including an executed state of the process, and causing, by the first core of the cores, the second core to suspend an execution of the process before the first core executes the monitoring thread.

7. The multi-core processor system according to claim 1, wherein the first core causes the second core to suspend the execution of the process and to execute another process.

* * * * *